United States Patent
Lu et al.

(10) Patent No.: US 12,406,043 B2
(45) Date of Patent: Sep. 2, 2025

(54) METHOD AND SYSTEM FOR IMPLEMENTING FINGERPRINT SHARING

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 15 days.

(21) Appl. No.: 18/283,459

(22) PCT Filed: Jul. 19, 2022

(86) PCT No.: PCT/CN2022/106566
§ 371 (c)(1),
(2) Date: Sep. 22, 2023

(87) PCT Pub. No.: WO2023/011168
PCT Pub. Date: Feb. 9, 2023

(65) Prior Publication Data
US 2024/0160711 A1 May 16, 2024

(30) Foreign Application Priority Data

Aug. 2, 2021 (CN) .......................... 202110878228.0
Aug. 2, 2021 (CN) .......................... 202110878230.8

(51) Int. Cl.
*G06F 21/32* (2013.01)
*H04L 9/40* (2022.01)

(52) U.S. Cl.
CPC .......... *G06F 21/32* (2013.01); *H04L 63/0861* (2013.01)

(58) Field of Classification Search
None
See application file for complete search history.

(56) References Cited

U.S. PATENT DOCUMENTS

| 2014/0195815 A1 | 7/2014 | Taveau et al. |
| 2016/0105285 A1 | 4/2016 | Jakobsson |
| 2017/0147801 A1 | 5/2017 | Hamlin et al. |

FOREIGN PATENT DOCUMENTS

| CN | 104778393 | 7/2015 |
| CN | 106650706 | 5/2017 |

(Continued)

OTHER PUBLICATIONS

ExcelSecu ("WBF releases on FIDO2 fingerprint key for Windows Hello"—May 10, 2023) (Year: 2023).*

(Continued)

*Primary Examiner* — Boris D Grijalva Lobos
(74) *Attorney, Agent, or Firm* — JCIPRNET

(57) ABSTRACT

The present disclosure discloses a method and system for implementing fingerprint sharing. When a device receives a fingerprint verifying instruction, starts to collect fingerprint information and determines whether the collected fingerprint information matches a stored fingerprint template, if yes, the device performs computation on the fingerprint template to obtain a fingerprint identification and returns the fingerprint identification to a terminal, the terminal inquires a database to determine whether user information is stored, if yes, the terminal prompts to replace a fingerprint and sends a fingerprint registering instruction, if no, the terminal prompts to input the fingerprint and sends a fingerprint registering instruction to the device; the device receives the fingerprint registering instruction, starts to collect fingerprint information and stores it, after compeleting collection, performs computation on the fingerprint template generated according to the stored fingerprint information to obtain a fingerprint identification and returns the fingerprint identification to the terminal.

19 Claims, 9 Drawing Sheets

(56) References Cited

FOREIGN PATENT DOCUMENTS

| | | |
|---|---|---|
| CN | 106790316 | 5/2017 |
| CN | 108022349 | 5/2018 |
| CN | 108064376 | 5/2018 |
| CN | 108134791 | 6/2018 |
| CN | 109583165 | 4/2019 |
| CN | 109690563 | 4/2019 |
| CN | 110287675 | 9/2019 |
| CN | 110619202 | 12/2019 |
| CN | 110619269 | 12/2019 |
| CN | 111970116 | 11/2020 |
| CN | 112669033 | 4/2021 |
| CN | 113312602 | 8/2021 |
| CN | 113312607 | 8/2021 |
| EP | 3206150 | 8/2017 |

OTHER PUBLICATIONS

Kensington ("How Biometric Security Can Protect Your Organization from Cybercrime"—Mar. 5, 2019) (Year: 2019).*
David W. Chadwick et al., "Improved Identity Management with Verifiable Credentials and FIDO", IEEE Communications Standards Magazine, Dec. 31, 2019, pp. 1-7.
Huang Zhenhang, "The Design and Implementation of Network Fingerprint Identification Platform", Dissertation for the Master's Degree in Engineering Harbin Institute of Technology, with English abstract, Feb. 28, 2017, pp. 1-77.
Li Lianglei et al., "The Scheme of Open Authorization Based on FIDO UAF", Netinfo Security, with English abstract, Jun. 30, 2017, pp. 1-8.
Office Action of China Counterpart Application, Application No. 202110878228.0, with English translation thereof, issued on Sep. 3, 2021, pp. 1-22.
Office Action of China Counterpart Application, Application No. 202110878228.0, with English translation thereof, issued on Sep. 24, 2021, pp. 1-23.
Office Action of China Counterpart Application, Application No. 202110878230.8, with English translation thereof, issued on Sep. 13, 2021, pp. 1-11.
Notification to Grant Patent Right for Invention, Application No. 202110878228.0, with English translation thereof, issued on Oct. 12, 2021, pp. 1-3.
Notification to Grant Patent Right for Invention, Application No. 202110878230.8, with English translation thereof, issued on Sep. 16, 2021, pp. 1-3.
"Written Opinion of the International Searching Authority (Form PCT/ISA/237) of PCT/CN2022/106566," mailed on Oct. 20, 2022, with English translation thereof, pp. 1-8.
"International Search Report (Form PCT/ISA/210) of PCT/CN2022/106566," mailed on Oct. 20, 2022, with English translation thereof, pp. 1-6.

* cited by examiner

METHOD AND SYSTEM FOR IMPLEMENTING FINGERPRINT SHARING

CROSS-REFERENCE TO RELATED APPLICATION

This application is a 371 of international application of PCT application serial no. PCT/CN2022/106566, and filed on Jul. 19, 2022, which claims priority to Chinese Patent Application No. 202110878230.8, filed on Aug. 2, 2021, and Chinese Patent Application No. 202110878228.0, and filed on Aug. 2, 2021. The entirety of each of the above-mentioned patent applications is hereby incorporated by reference herein and made a part of this specification.

TECHNICAL FIELD

The present disclosure relates to the field of information security and, in particular, to a method and a system for implementing fingerprint sharing.

BACKGROUND

Fast identity online device (FIDO device) is applied to a password free scene of a main stream website at present, however, the fast identity online device does not support local system registering, which does not require a Microsoft account and network connecting. As a way for biometric authorization, the existing windows hello may use biometrics such as face, iris or fingerprint to unlock a device, which supports a local system operation. As a parallel mode of registering a local operating system by using password, PIN code, etc., the windows hello is more safe and convenient for use and is implemented by relying on WBF (Windows Biometric Framework) technology. Till now, an application scenario of fingerprint registering and usage of the FIDO device is relatively independent from an application scenario of fingerprint registering and usage of the windows hello. How to combine the fingerprint registering and usage of the windows hello with the fingerprint registering and usage of the FIDO device and provide a safe and convenient method for implementing fingerprint sharing is an urgent problem to be solved in the prior art.

SUMMARY

A purpose of the present disclosure is providing a method and system for fingerprint sharing so as to overcome deficiency of the prior art.

The present disclosure provides a method for implementing fingerprint sharing, includes:

Step S0, when a device builds a connection with a terminal, reporting, by the device, to the terminal that the device has a WBF port and an FIDO port;

Step S1, when the terminal receives WBF register information triggered by a user, prompting, by the terminal, the user to input a fingerprint and sending a fingerprint verifying instruction to the device via the WBF port;

Step S2, receiving, by the device, the fingerprint verifying instruction, starting to collect fingerprint information and determining whether collected fingerprint information matches a stored fingerprint template, if yes, executing Step S3, if no, returning information that verification is failed to the terminal via the WBF port, executing Step S6;

Step S3, performing, by the device, computation on a matched fingerprint template to obtain a fingerprint identification, returning a computed fingerprint identification to the terminal via the WBF port;

Step S4, when the terminal receives the fingerprint identification, inquiring, by the terminal, a database to determine whether user information corresponding to the fingerprint identification is stored in the database, if yes, executing Step S5, if no, executing Step S6;

Step S5, prompting, by the terminal, the user to replace a fingerprint and sending a fingerprint registering instruction to the device via the WBF port, executing Step S7;

Step S6, prompting, by the terminal, the user to input a fingerprint and sending the fingerprint registering instruction to the device via the WBF port, executing Step S7;

Step S7, receiving, by the device, the fingerprint registering instruction, starting to collect fingerprint information and storing collected fingerprint information, determining whether collection of the fingerprint information is completed, if yes, generating a fingerprint template according to stored fingerprint information and storing the fingerprint template, performing computation on a generated fingerprint template to obtain a fingerprint identification, returning the fingerprint identification to the terminal via the WBF port and setting an identification indicating that the fingerprint is registered in FIDO configuration, executing Step S8, if no, returning information that the collection is uncompleted to the terminal via the WBF port, executing Step S8;

Step S8, determining, by the terminal, received information, if the received information is the fingerprint identification, executing Step S9, if the received information is that the collection is uncompleted, going back to Step S6; and Step S9, storing, by the terminal, the user information provided by an operating system and the fingerprint identification in the database.

The present disclosure provides another method for implementing fingerprint sharing, which includes:

Step s0, when a device builds a connection with a terminal, reporting, by the device, to the terminal that the device has a WBF port and an FIDO port;

Step s1, when the terminal receives WBF register information triggered by a user, prompting, by the terminal, a user to input a fingerprint and sending a fingerprint verifying instruction to the device via the WBF port;

Step s2, receiving, by the device, a fingerprint verifying instruction, starting to collect fingerprint information and determining whether collected fingerprint information and stored fingerprint template are matched, if yes, executing Step s3, if no, returning information that verification is failed to the terminal via the WBF port, executing Step s5; where the stored fingerprint template is stored in a process of registering a fingerprint via the WBF port or via the FIDO port;

Step s3, performing, by the device, computation on a matched fingerprint template to obtain a fingerprint identification and returning the fingerprint identification to the terminal via the WBF port;

Step s4, when the terminal receives the fingerprint identification returned by the device, inquiring, by the terminal, a database to determine whether user information corresponding to a received fingerprint identification is stored in the database, if yes, prompting, by the terminal, that a current fingerprint is registered already, if no, storing the user information provided by an operating system and the received fingerprint identification correspondingly in the database;

Step s5, prompting, by the terminal, the user to input a fingerprint and sending a fingerprint registering instruction to the device via the WBF port;

Step s6, receiving, by the device, the fingerprint registering instruction, starting to collect fingerprint information and storing collected fingerprint information, determining whether collection of fingerprint information is completed, if yes, generating a fingerprint template according to stored fingerprint information and storing a generated fingerprint template, performing computation on the generated fingerprint template to obtain a fingerprint identification, returning the fingerprint identification to the terminal via the WBF port, executing Step s7; if no, returning information that collection is uncompleted to the terminal via the WBF port, executing Step s7; and Step s7, determining, by the terminal, received information, if the received information is a fingerprint identification, storing the user information provided by the operating system and the fingerprint identification correspondingly in the database, if the received information is that collection is uncompleted, going back to Step s5.

The present disclosure further provides a system for implementing fingerprint sharing, including a terminal and a device, the device includes: a reporting module, a first collecting and determining module, a first computing and returning module, a collecting and storing module and a determining-computing-returning module, where the terminal includes: a first prompting and sending module, a first inquiring module, a second prompting and sending module, a third prompting and sending module, a first determining module and a first storing module;

the reporting module is configured to, when the device builds a connection with the terminal, report to the terminal that the device has a WBF port and an FIDO port to the terminal;

the first prompting and sending module is configured to, when the terminal receives WBF register information triggered by a user, prompt the user to input a fingerprint and send a fingerprint verifying instruction to the device via the WBF port;

the first collecting and determining module is configured to receive a fingerprint verifying instruction, start to collect fingerprint information and determine whether the collected fingerprint information matches a stored fingerprint template, if yes, trigger the first computing and returning module, if no, return information that verification is failed to a terminal via the WBF port and trigger the third prompting and sending module;

the first computing and returning module is configured to perform computation on the matched fingerprint template to obtain a fingerprint identification and return the fingerprint identification obtained through the computation to the terminal via the WBF port;

the first inquiring module is configured to, when receiving the fingerprint identification, inquire a database to determine whether user information corresponding to the fingerprint identification is stored in the database, if yes, trigger the second prompting and sending module, if no, trigger the third prompting and sending module;

the second prompting and sending module is configured to prompt the user to replace the fingerprint and send a fingerprint registering instruction to the device via the WBF port, trigger the collecting and storing module;

the third prompting and sending module is configured to prompt the user to input the fingerprint and send a fingerprint registering instruction to the device via the WBF port and trigger the collecting and storing module;

the collecting and storing module is configured to receive the fingerprint registering instruction, start to collect fingerprint information and store the collected fingerprint information;

the determining-computing-returning module is configured to determine whether collection of fingerprint information is completed, if yes, generate a fingerprint template according to the stored fingerprint information and store the fingerprint template, perform computation on the generated fingerprint template to obtain a fingerprint identification, return the fingerprint identification to the terminal via the WBF port and set an identification indicating that the fingerprint is registered in FIDO configuration, trigger the first determining module, if no, return information that collection is uncompleted to the terminal via the WBF port and trigger the first determining module;

the first determining module is configured to perform a determination on the received information, if the received information is a fingerprint identification, trigger the first storing module, if the received information is that collection is uncompleted, trigger the third prompting and sending module; and the first storing module is configured to store the user information provided by the operating system and the fingerprint identification correspondingly in the database.

The present disclosure provides another system for implementing fingerprint sharing, which includes a terminal and a device;

the terminal includes a first prompting and sending module, a first inquiring and storing module, a second prompting and sending module and a first determining module;

the device includes a reporting module, a first collecting and determining module, a first computing and returning module, a collecting-storing-determining module and a second computing and returning module;

the reporting module is configured to, when the device builds a connection with the terminal, report to the terminal that the device has a WBF port and an FIDO port;

the first prompting and sending module is configured to, when the terminal receives WBF register information triggered by a user, prompt a user to input a fingerprint and send a fingerprint verifying instruction to the device via the WBF port;

the first collecting and determining module is configured to receive a fingerprint verifying instruction, start to collect fingerprint information and determine whether the collected fingerprint information matches the stored fingerprint template, if yes, trigger the first computing and returning module, if no, return information that verification is failed to the terminal via the WBF port, trigger the second prompting and sending module; the fingerprint template stored is stored in a process of registering a fingerprint via the WBF port or via the FIDO port;

the first computing and returning module is configured to perform computation on the matched fingerprint template to obtain a fingerprint identification and return the fingerprint identification to the terminal via the WBF port;

the first inquiring and storing module is configured to, when the terminal receives the fingerprint identification returned by the device, inquire a database to determine whether user information corresponding to the received fingerprint identification is stored in the database, if yes, prompt that current fingerprint is registered already, if no, store the user information provided by an operating system and the received fingerprint identification correspondingly in the database;

the second prompting and sending module is configured to prompt the user to input a fingerprint and send a fingerprint registering instruction to the device via the WBF port;

the collecting-storing-determining module is configured to receive the fingerprint registering instruction, start to collect fingerprint information and store the collected fingerprint information, determine whether collection of fingerprint information is completed, if yes, trigger the second computing and returning module, if no, return information that collection is uncompleted to the terminal via the WBF port and trigger the first determining module;

the second computing and returning module is configured to generate a fingerprint template according to the stored fingerprint information and store the fingerprint template, perform computation on the generated fingerprint template to obtain a fingerprint identification, return the fingerprint identification to the terminal via the WBF port, trigger the first determining module; and the first determining module is configured to perform a determination on the received information, if the received information is a fingerprint identification, store the user information provided by the operating system and the fingerprint identification correspondingly into the database, if the received information is that collection is uncompleted, trigger the second prompting and sending module.

BRIEF DESCRIPTION OF DRAWINGS

In order to illustrate technical solutions of embodiments of the present disclosure or technical solutions in the prior art, a brief introduction will be given to the drawings required in the description of the embodiments or the prior art. It is obvious that the described drawings below are only a part of the embodiments of the present disclosure. Other drawings can also be obtained by those of ordinary skill in the art based on these drawings without creative efforts.

DESCRIPTION OF EMBODIMENTS

Figure 1:
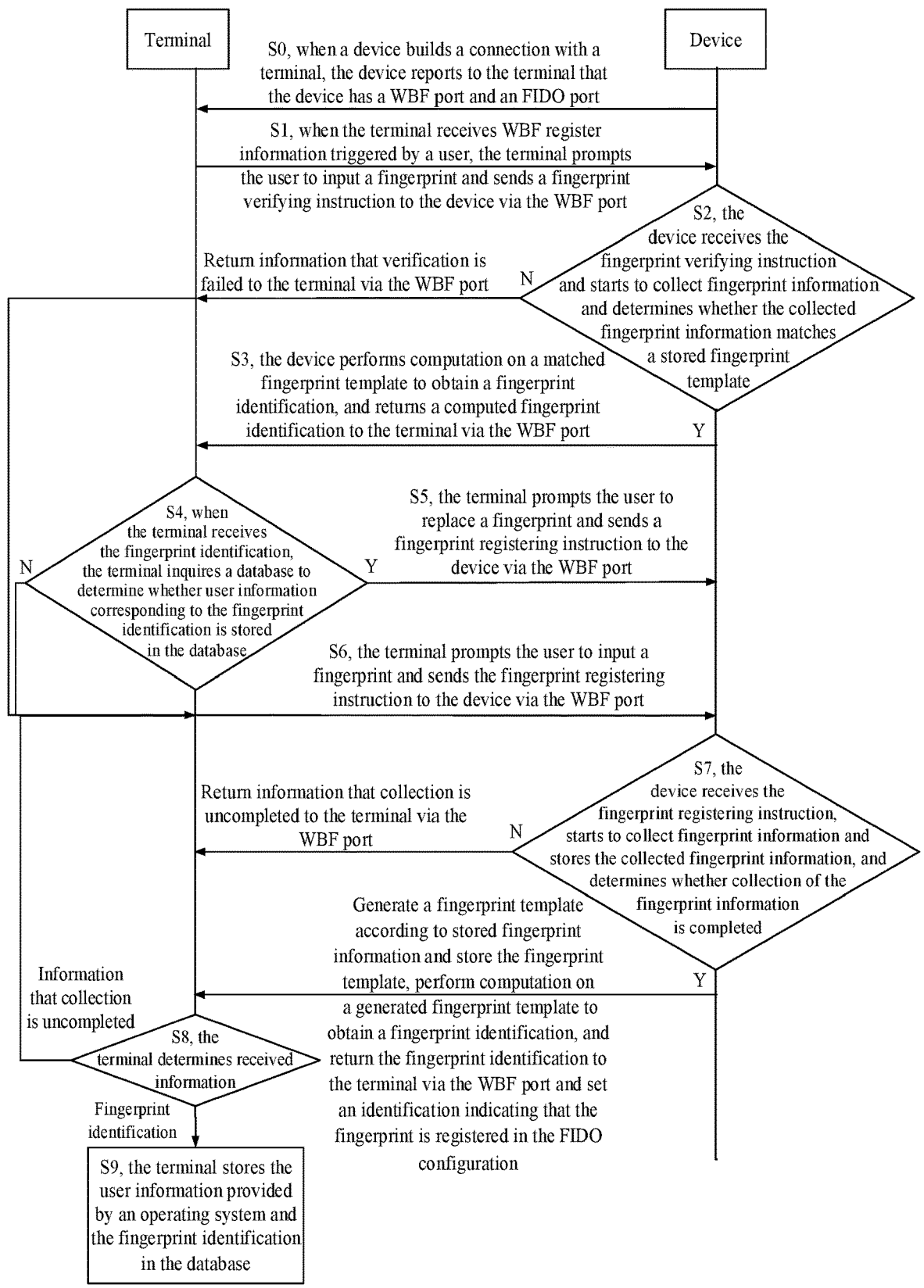
FIG. 1 is a flow chart for a method for implementing fingerprint sharing provided by Embodiment 1 of the present disclosure.

The present disclosure provides a method and system for implementing fingerprint sharing. With reference to the drawings, the specific implementations of the present disclosure will beillustrated in detail below. Examples of the embodiments are shown in the drawing. The embodiments described below with reference to the drawings are exemplary and are only intended to explain the present disclosure, ranther than being interpreted as limiting the present disclosure.

Those skilled in the art can understand that, unless defined otherwise, all terms used herein (including technical and scientific terms) have the same meaning as commonly understood by one of ordinary skill in the art to which the present disclosure belongs. Terms such as those defined in a general dictionary should be understood to have meanings that match those in the context of existing technology, and unless specifically defined as such, they will not be interpreted with idealized or overly formal meanings.

In order to make the purpose, technical solution and advantages of the present disclosure clearer, the following will provide a further detailed description of the implementations of the present disclosure in conjunction with the drawings.

The present embodiment provides a compound device which supports both an FIDO operation and a windows hello fingerprint operation. The fingerprint registered via the windows hello can be used in FIDO application, which avoids a problem of repeating of registering the fingerprint of the windows hello and the FIDO application, improves compatibility of the device, implements that a user can register more than one piece of fingerprint information and is convenient for a user to use; in this case, the windows hello fingerprint operation is illustrated by an example of the WBF application.

Embodiment 1

Embodiment 1 of the present disclosure provides a method for implementing fingerprint sharing. As shown by FIG. 1, the method of the present embodiment includes the following.

Step S0, when a device builds a connection with a terminal, the device reports to the terminal that the device has a WBF port and an FIDO port.

Step S1, when the terminal receives WBF register information triggered by a user, the terminal prompts the user to input a fingerprint and sends a fingerprint verifying instruction to the device via the WBF port.

Step S2, the device receives the fingerprint verifying instruction and starts to collect fingerprint information and determines whether the collected fingerprint information matches the stored fingerprint template, if yes, executes Step S3, if no, returning information that verification is failed to the terminal via the WBF port, executes Step S6.

In the present embodiment, if no fingerprint template is stored in the device, in Step S2, it is determined that the result is unmatched and the device returns information that verification is failed to the terminal via the WBF port, executes Step S6.

Step S3, the device performs computation on the matched fingerprint template to obtain a fingerprint identification, and returns the generated fingerprint identification to the terminal via the WBF port.

In the present embodiment, the performing the computation on the matched fingerprint template to obtain the fingerprint identification is specifically that the device performs a hash computation on the matched fingerprint template to obtain the fingerprint identification.

Step S4, when the terminal receives the fingerprint identification, the terminal inquires a database to determine whether user information corresponding to the fingerprint identification is stored in the database, if yes, executes Step S5, if no, executes Step S6.

Specifically, in the present embodiment, Step S4 includes:
Step S41, when the terminal receives the fingerprint identification returned from the device, the terminal searches for a database via a fourth interface and opens the database via a fifth interface;
Step S42, the terminal takes a first record in the found database as a current record via a sixth interface;
Step S43, the terminal obtains content of the current record via a seventh interface, determines whether the content of the obtained current record matches the received fingerprint identification, if yes, executes Step S5, if no, executes Step S44;
Step S44, the terminal determines whether an unprocessed record exists in the database, if yes, executes Step S45, if no, executes Step S6; and
Step S45, the terminal takes a next record in the found database as the current record via an eighth interface, goes back to Step S43.

Step S5, the terminal prompts the user to replace a fingerprint and sends a fingerprint registering instruction to the device via the WBF port, executes Step S7.

In an implementation, in Step S5 of the present embodiment, before sending the fingerprint registering instruction to the device via the WBF port, the method further includes: when receiving information of confirming replacing, the terminal sends the fingerprint registering instruction to the device via the WBF port.

Step S6, the terminal prompts the user to input a fingerprint and sends the fingerprint registering instruction to the device via the WBF port, executes Step S7.

Step S7, the device receives the fingerprint registering instruction, starts to collect fingerprint information and stores the collected fingerprint information, determines whether collection of the fingerprint information is completed, if yes, the device generates a fingerprint template according to the stored fingerprint information and stores the fingerprint template, performs computation on the generated fingerprint template to obtain a fingerprint identification, returns the fingerprint identification to the terminal via the WBF port and sets an identification indicating that the fingerprint is registered in FIDO configuration, executes Step S8, if no, the device returns information that the collection is uncompleted to the terminal via the WBF port, executes Step S8.

Specifically, in the present embodiment, Step S7 includes the following.

Step S71, the device receives a fingerprint registering instruction, starts to collect the fingerprint information and stores the collected fingerprint information.

Specifically, Step S71 in the present embodiment includes:
Step S71-1, the device receives the fingerprint registering instruction and starts to collect fingerprint information; and
Step S71-2, the device determines whether a current collecting state is successful collection, if yes, stores the collected fingerprint information, executes Step S72, if no, returns information that the collection is failed to the terminal via the WBF port, and executes Step S8.

Step S72, the device updates remained collecting times and determines whether current remained collecting times is a collecting threshold value, if yes, execute Step S73, if no, return information that collection is uncompleted to the terminal via the WBF port, execute Step S8.

Step S73, the device generates a fingerprint template according to the stored fingerprint information and stores the fingerprint template, performs computation on the generated fingerprint template to obtain a fingerprint identification, sends the fingerprint identification to the terminal via the WBF port, sets an identification indicating the fingerprint is registered in the FIDO configuration, executes Step S8.

In an implementation, Step S73 of the present embodiment further includes: the device returns the current remained collecting times to the terminal via the WBF port.

In the present embodiment, the performing computation on the generated fingerprint template to obtain the fingerprint identification is specifically: the device performs a hash computation on the generated fingerprint template to obtain a fingerprint identification.

Step S8, the terminal performs a determination on received information, if the received information is the fingerprint identification, executes Step S9, if the received information is that collection is the collection is uncompleted, goes back to Step S6.

Specifically, in the present embodiment, Step S8 includes:
Step B1, the terminal determines whether receiving the fingerprint identification and remained collecting times, if yes, executes Step B1, if no, goes back to Step S6;
Step B2, the terminal determines whether the remained collecting times reaches a collecting threshold value, if yes, executes Step S9, if no, goes back to Step S6.

Step S9, the terminal stores the user information provided by an operating system and the fingerprint identification in the database.

In an implementation, the method of the present embodiment further includes a fingerprint verifying process of the WBF application. After Step S0, the method further includes:
Step T1, when the terminal receives login information, the terminal determines a login manner selected by the user, if the login manner is a type of WBF fingerprint login, executes Step T2;
Step T2, the terminal prompts the user to input the fingerprint and sends a fingerprint verifying instruction to a connected device via the WBF port;
Step T3, the device receives the fingerprint verifying instruction, starts to collect fingerprint information, determines whether the collected fingerprint information matches the stored fingerprint template, if yes, executes Step T4, if no, reports an error, the procedure is ended;
Step T4, the device performs computation on the matched fingerprint template to obtain a fingerprint identification and returns the fingerprint identification to the terminal;
Step T5, when receiving the fingerprint identification returned from the device, the terminal searches for corresponding user information in the database according to the fingerprint identification, if the corresponding user information is found, executes Step T6, if the corresponding user information is not found, the procedure is ended; and Step T6, the terminal permits the user corresponding to the user information to perform a current operation.

In an implementation, the method of the present embodiment further includes a fingerprint verifying process of an FIDO device, that is, after Step S0, the method further includes the following.

Step Y1, when the terminal receives FIDO register credential information triggered by the user, the terminal sends a device information obtaining instruction to a connected device via the FIDO port.

Step Y2, the device returns a device information response to the terminal via the FIDO port.

Step Y3, the terminal determines whether the connected device supports a fingerprint operation according to the received device information response, if yes, executes Step Y4, if no, executes a non-fingerprint FIDO register credential process.

Step Y4, the terminal determines whether a fingerprint template is stored in the device according to the received device information response, if yes, executes Step Y5, if no, executes the non-fingerprint FIDO register credential process.

In the present embodiment, the device information response includes an identification indicating that fingerprint is registered in the FIDO configuration.

Specifically, Step Y4 includes: the terminal determines whether the received device information response includes an identification indicating that fingerprint is registered, if yes, executes Step Y5, if no, executes a non-fingerprint FIDO register credential process.

Step Y5, the terminal sends an FIDO registering instruction to the connected device via the FIDO port.

Step Y6, the device receives the FIDO registering instruction, starts to collect fingerprint information, determines whether the collected fingerprint information matches the stored fingerprint template, if yes, returns information that registering is successful to the terminal via the FIDO port, executes Step Y7, if no, returns information that registering is failed to the terminal via the FIDO port, executes Step Y7.

Step Y7, the terminal determines a type of received information, if the received information is that registering is successful, keeps on performing an FIDO register credential operation, if the received information is that registering is failed, reports an error and the procedure is ended.

The device provided by the present embodiment is a compound device which supports both the FIDO operation and the fingerprint operation, is adapted widely, more convenient and cost effective. The device can use the fingerprint registered through the windows hello in the FIDO application, which avoids a problem of repeating registering fingerprint for the windows hello and the FIDO application, improves compatibility of the device and implements that a user can register multiple pieces of fingerprint information and is convenient for the user to use.

Embodiment 2

Embodiment 2 of the present disclosure provides a method for implementing fingerprint sharing, which includes a fingerprint registering process and a fingerprint verifying process. Before implementing the method of the present embodiment, a device is connected to a terminal and the device reports to the terminal that the device has the WBF port and the FIDO port.

Figure 2:
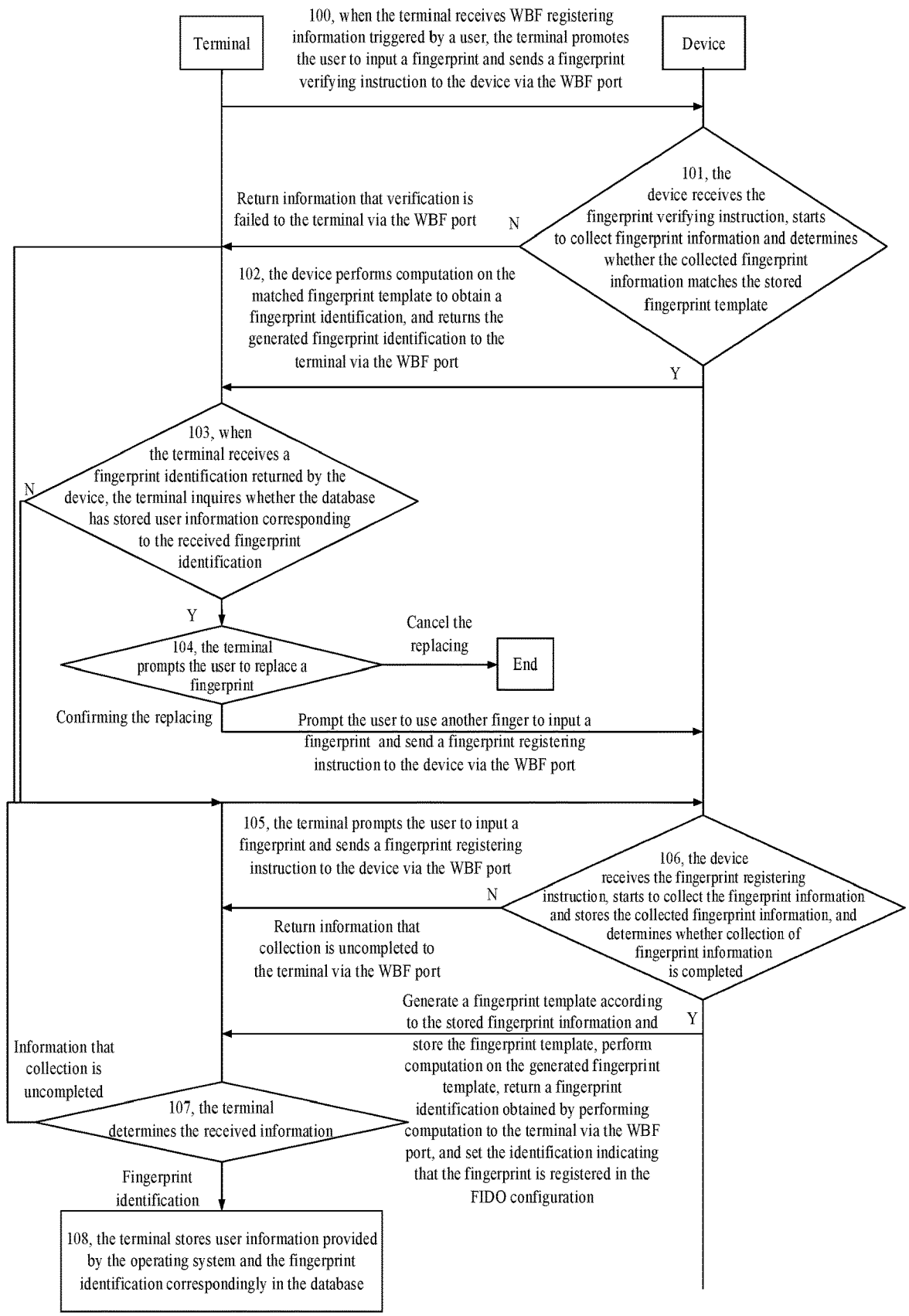
FIG. 2 is a flow chart for a fingerprint register process in a method for implementing fingerprint sharing provided by Embodiment 2 of the present disclosure.

As shown by FIG. 2, the method of the present embodiment includes the following.

Step 100, when the terminal receives WBF registering information triggered by a user, the terminal promotes the user to input a fingerprint and sends a fingerprint verifying instruction to the device via the WBF port.

In an implementation, if the device and the terminal are not connected, the user can not trigger a WBF fingerprint button.

Step 101, the device receives the fingerprint verifying instruction, starts to collect fingerprint information and determines whether the collected fingerprint information matches the stored fingerprint template, if yes, executes Step 102, if no, returns information that verification is failed to the terminal via the WBF port, executes Step 105.

In an implementation, before implementing the method of the present embodiment, the user inputs his or hers fingerprint to the device, the device collects fingerprint information input by the user and generates a fingerprint template matched according to the collected fingerprint information and stores the fingerprint template.

If no fingerprint template is stored in the device, in Step 101, it is determined that the the result is unmatched, the device returns information that verification is failed to the terminal via the WBF port, executes Step 105.

In the present embodiment, the terminal invokes a first interface to activate a process of fingerprint collecting; after the collection is completed, a second interface is invoked to end the process of fingerprint collecting. Specifically, in the present embodiment, the first interface is a fingerprint collecting activating interface, and the second interface is a fingerprint collecting ending interface.

For example, the first interface is:

```
SensorAdapterStartCapture(
    _Inout_ PWINBIO_PIPELINE Pipeline,
    _In_ WINBIO_BIR_PURPOSE Purpose,
    _Out_ LPOVERLAPPED *Overlapped
);
the second interface is:
SensorAdapterFinishCapture(
    _Inout_ PWINBIO_PIPELINE Pipeline,
    _Out_ PWINBIO_REJECT_DETAIL RejectDetail
).
```

Step 102, the device performs computation on the matched fingerprint template to obtain a fingerprint identification, and returns the generated fingerprint identification to the terminal via the WBF port.

In an implementation, the device performs hash computation on the matched fingerprint template to obtain a fingerprint identification and returns the fingerprint identification to the terminal.

In the present embodiment, the device invokes a third interface to perform computation on the matched fingerprint template, specifically, the third interface is a fingerprint computing interface, for example, the third interface is:

```
EngineAdapterIdentifyFeatureSet(
    _Inout_ PWINBIO_PIPELINE Pipeline,
    _Out_ PWINBIO_IDENTITY Identity,
    _Out_ PWINBIO_BIOMETRIC_SUBTYPE SubFactor,
    _Out_ PUCHAR *PayloadBlob,
    _Out_ PSIZE_T PayloadBlobSize,
    _Out_ PUCHAR *HashValue,
```

```
_Out_ PSIZE_T HashSize,
_Out_ PWINBIO_REJECT_DETAIL RejectDetail
).
```

Step 103, when the terminal receives a fingerprint identification returned by the device, the terminal inquires whether the database has stored user information corresponding to the received fingerprint identification, if yes, executes Step 104, if no, executes Step 105.

Specifically, in the present embodiment, Step 103 includes the following.

Step 103-1, when the terminal receives the fingerprint identification returned from the device, the terminal searches for a database via a fourth interface and opens the database via a fifth interface.

Specifically, the fourth interface of the present embodiment is a database querying interface, the fifth interface is a database opening interface.

For example, the fourth interface is:

```
StorageAdapterQueryBySubject(
    _Inout_ PWINBIO_PIPELINE Pipeline,
    _In_ PWINBIO_IDENTITY Identity,
    _In_ WINBIO_BIOMETRIC_SUBTYPE SubFactor
);
``` the fifth interface is:

```
StorageAdapterOpenDatabase(
    _Inout_ PWINBIO_PIPELINE Pipeline,
    _In_ PWINBIO_UUID DatabaseId,
    _In_ LPCWSTR FilePath,
    _In_ LPCWSTR ConnectString
).
```

Step 103-2, the terminal takes a first record in the found database as a current record via a sixth interface.

Specifically, the sixth interface in the present embodiment is a first record inquiring interface, for example, the sixth interface is:

```
StorageAdapterFirstRecord(
    _Inout_ PWINBIO_PIPELINE Pipeline
).
```

Step 103-3, the terminal obtains content of the current record via a seventh interface, determines whether the obtained content of the current record matches the received fingerprint identification, if yes, executes Step 104, if no, executes Step 103-4.

Specifically, the seventh interface of the present embodiment is a record content obtaining interface, for example, the seventh interface is:

```
StorageAdapterGetCurrentRecord(
    _Inout_ PWINBIO_PIPELINE Pipeline,
    _Out_ PWINBIO_STORAGE_RECORD RecordContents
).
```

Step 103-4, the terminal determines whether an unprocessed record exists in the database, if yes, executes Step 103-5, if no, executes Step 105.

Step 103-5, the terminal takes a next record in the found database as the current record via an eighth interface, goes back to Step 103-3.

Specifically, the eighth interface in the present embodiment is a next record inquiring interface, for example, the eighth interface is:

```
StorageAdapterNextRecord(
    _Inout_ PWINBIO_PIPELINE Pipeline
).
```

Step 104, the terminal prompts the user to replace a fingerprint, if the user confirms replacing a fingerprint, the terminal prompts the user to use another finger to input a fingerprint and sends a fingerprint registering instruction to the device via the WBF port, executes Step 106, if the user cancels the replacing, the procedure is ended.

Specifically, in the present embodiment, Step 104 includes: prompt the user to use another finger to input a fingerprint, if receiving information of confirming replacing, send a fingerprint registering instruction to the device via the WBF port, execute Step 106, if receiving information of canceling button, the procedure is ended.

Step 105, the terminal prompts the user to input a fingerprint and sends a fingerprint registering instruction to the device via the WBF port, executes Step 106.

Step 106, the device receives the fingerprint registering instruction, starts to collect fingerprint information and stores the collected fingerprint information, determines whether collection of the fingerprint information is completed, if yes, generates a fingerprint template according to the stored fingerprint information and stores the fingerprint template, performs computation on the generated fingerprint template, returns a fingerprint identification obtained by performing computation to the terminal via the WBF port, sets the identification indicating that the fingerprint is registered in the FIDO configuration, executes Step 107, if no, returns information that collection is uncompleted to the terminal via the WBF port, executs Step 107.

In the present embodiment, Step 106 includes the following.

Step A1, the device receives the fingerprint registering instruction, starts to collect fingerprint information and store the collected fingerprint information.

Specifically, Step A1 includes:
Step A11, the device receives the fingerprint registering instruction and starts to collect fingerprint information.
Step A12, the device determines whether the current collection state is successful collection, if yes, stores the collected fingerprint information, executes Step A2, if no, returns information of failed collection to the terminal via the WBF port, and executes Step 107.

In the present embodiment, the device determines whether the collecting state is successful collection via a ninth interface, the ninth interface is specifically a collecting state interface, for example, the ninth interface is:

```
EngineAdapterUpdateEnrollment(
    _Inout_ PWINBIO_PIPELINE Pipeline,
    _Out_ PWINBIO_REJECT_DETAIL RejectDetail
).
```

Step A2, update remained collecting times, determines whether the current remained collecting times is a collecting threshold value, if yes, generate a fingerprint template according to the stored fingerprint information and store the fingerprint template, perform computation on the generated fingerprint template, return the fingerprint identification obtained by performing computation to the terminal via the WBF port, set the identification indicating that fingerprint is registered in the FIDO configuration, execute Step 107, if no, return information that collection is uncompleted to the terminal via the WBF port, execute Step 107.

In an implementation, in Step A2, when it is determed that the result is yes, the method further includes: returning the current remained collecting times to the terminal via the WBF port.

Step 107, the terminal determines the received information, if the received information is a fingerprint identification, executes Step 108, if the received information is that collection is uncompleted, goes back to Step 105.

In the present embodiment, Step 107 includes:

Step 107-1, the terminal determines whether receiving the fingerprint identification and the remained collecting times, if yes, executes Step 107-2, if no, goes back to Step 105;

Step 107-2, the terminal determines whether the remained collecting times is a collecting threshold value, if yes, executes Step 108, if no, goes back to Step 105.

Step 108, the terminal stores user information provided by the operating system and the fingerprint identification correspondingly in the database.

For example, in the present embodiment, the information stored in the data base includes user information and fingerprint identification.

In the present embodiment, the terminal stores the user information and the fingerprint identification correspondingly in the database via the tenth interface, where the tenth interface is specifically a data storing interface, for example, the tenth interface is:

```
WbioStorageAddRecord(
    _Inout_ PWINBIO_PIPELINE Pipeline,
    _In_ PWINBIO_STORAGE_RECORD RecordContents
).
```

Figure 3:
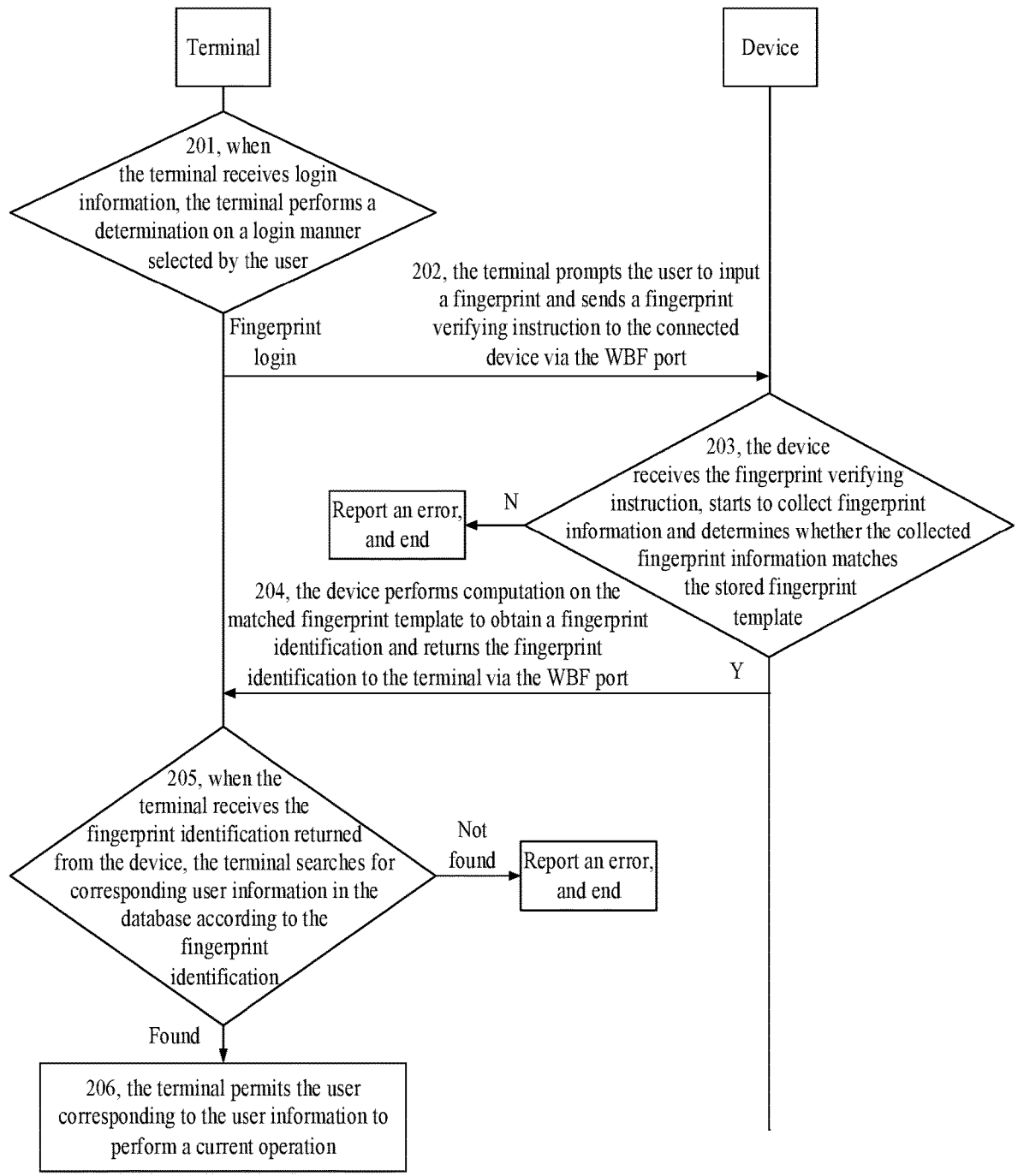
FIG. 3 is a flow chart for a fingerprint verifying process in the method for implementing fingerprint sharing provided by Embodiment 2 of the present disclosure.

The present embodiment further includes a fingerprint verifying process. As shown by FIG. 3, the process includes the following.

Step 201, when the terminal receives login information, the terminal performs a determination on a login manner selected by the user, if the login manner is fingerprint login through a WBF type, executes Step 202.

In an implementation, if the device is not connected to the terminal, the user can not trigger a WBF fingerprint verifying button.

Step 202, the terminal prompts the user to input a fingerprint and sends a fingerprint verifying instruction to the connected device via the WBF port.

Step 203, the device receives the fingerprint verifying instruction, starts to collect fingerprint information and determines whether the collected fingerprint information matches the stored fingerprint template, if yes, executes Step 204, if no, reports an error, the procedure is ended.

In an implementation, before the method of the present embodiment, the user inputs a fingerprint to the device, the device collects fingerprint information input by the user and generates a matched fingerprint template according to the collected fingerprint information and stores the matched fingerprint template.

If the device has stored no fingerprint template, in Step 203, it is determined that the result is unmatched and the device returns information that verification is failed to the terminal via the WBF port, execute Step 202.

In the present embodiment, the terminal invokes a first interface to activate a process of fingerprint collecting; after the collection is completed, a second interface is invoked to end the process of fingerprint collecting. Specifically, in the present embodiment, the first interface is a fingerprint collecting activating interface, and the second interface is a fingerprint collecting ending interface.

Step 204, the device performs computation on the matched fingerprint template to obtain a fingerprint identification and returns the fingerprint identification to the terminal via the WBF port.

In the present embodiment, the terminal performs computation on the matched fingerprint template via the third interface.

Step 205, when the terminal receives the fingerprint identification returned from the device, the terminal searches for corresponding user information in the database according to the fingerprint identification, if the user information is found, executes Step 206, if the user information is not found, the procedure is ended.

Specifically, in the present embodiment, Step 205 includes the following.

Step 205-1, when the terminal receives the fingerprint identification returned by the device, the terminal searches for the database via the fourth interface, opens the database via the fifth interface.

Step 205-2, the terminal takes the first register record in the found database as a current register record via the sixth interface.

Specifically, the register record in the present embodiment includes a fingerprint identification and corresponding user information.

Step 205-3, the terminal obtains a current register record via a seventh interface, determines whether the obtained current register record matches the received fingerprint identification, if yes, promotes that the current fingerprint is registered already, if no, executes Step 205-4.

Step 205-4, the terminal determines whether an unprocessed register record exists in the database, if yes, executes Step 205-5, if no, executes Step 108.

Step 205-5, the terminal takes a next register record in the found database as the current register record via an eighth interface, and goes back to Step 205-3.

Step 206, the terminal permits the user corresponding to the user information to perform a current operation.

Figure 4:
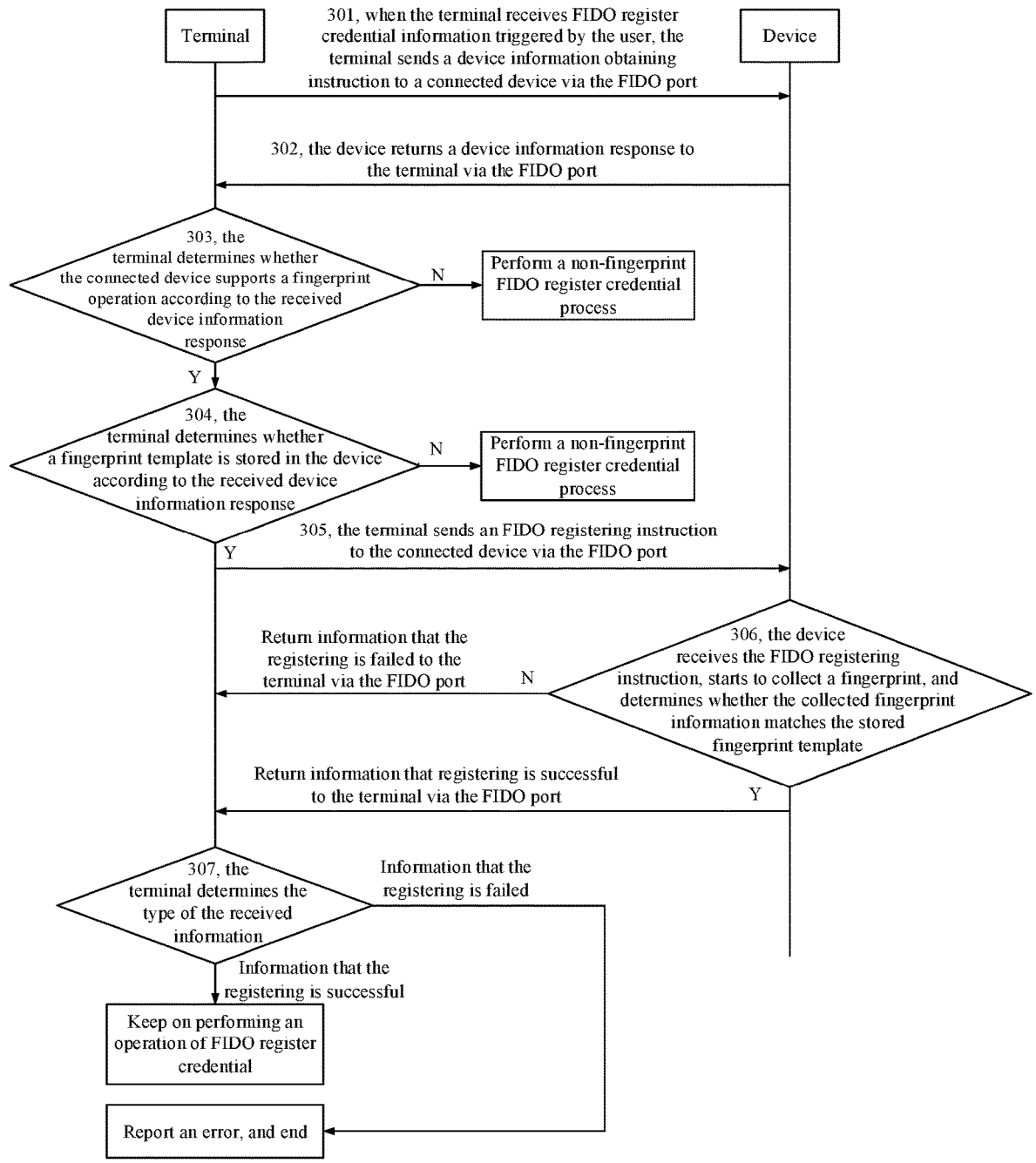
FIG. 4 is a flow chart for a method for implementing fingerprint sharing in an FIDO application provided by Embodiment 2 of the present disclosure.

As shown by FIG. 4, the present embodiment further provides a method for implementing fingerprint sharing in the FIDO application, which includes the following.

Step 301, when the terminal receives FIDO register credential information triggered by the user, the terminal sends a device information obtaining instruction to a connected device via the FIDO port.

Step 302, the device returns a device information response to the terminal via the FIDO port.

In an implementation, the device information response includes a device identification; further, the device is stored with a fingerprint.

Step 303, the terminal determines whether the connected device supports a fingerprint operation according to the received device information response, if yes, executes Step 304, if no, performs a non-fingerprint FIDO register credential process.

In the present embodiment, performing the non-fingerprint FIDO register credential process is the prior art, no more detail is given here.

Step 304, the terminal determines whether a fingerprint template is stored in the device according to the received device information response, if yes, executes Step 305, if no, executes the non-fingerprint FIDO register credential process.

Specifically, in the present embodiment, Step 304 includes: the terminal determines whether the received device information response includes identification that fingerprint is registered, if yes, executes Step 305, if no, reports an error, and the procedure is ended.

Step 305, the terminal sends an FIDO registering instruction to the connected device via the FIDO port.

Step 306, the device receives the FIDO registering instruction, starts to collect a fingerprint, determines whether the collected fingerprint information matches the stored fingerprint template, if yes, returns information that the registering is successful to the terminal via the FIDO port, executes Step 307, if no, returns information that the registering is failed to the terminal via the FIDO port, executes Step 307.

Step 307, the terminal determines the type of the received information, if the received information is successful registering, keeps on performing an operation of FIDO register credential, if the received information is failed registering, reports an error, the procedure is ended.

In the present embodiment, keeping on performing the operation of FIDO register credential is the prior art, and no more detail is given here.

In the method of the present embodiment, in a fingerprint registering process, the device starts to collect fingerprint information after receiving the fingerprint verifying instruction and stores the collected fingerprint information, generates a matched fingerprint template according to the stored fingerprint information after collecting fingerprint information is completed and stores the matched fingerprint template, performs computation on the matched fingerprint template to obtain an fingerprint identification, exports the fingerprint identification from the device and stores the fingerprint identification and the user information provided by the operating system correspondingly in the terminal. Since original data of the fingerprint information is not exported, the fingerprint identification is unique associated information as a medium, which improves security of the device. If it determines that the current fingerprint is registered in the fingerprint registering process, the user may be prompted to use another finger for inputting new fingerprint information, therefore a user can register more than one piece of fingerprint information; the device receives the fingerprint registering instruction, starts to collect fingerprint information and stores the fingerprint information; after completing the collection of the fingerprint information, the device generates a fingerprint template according to the stored fingerprint information and stores the fingerprint template; meanwhile, the device sets an identification indicating that fingerprint is registered (in the case that the identification indicating that fingerprint is registered is detected in the FIDO application, the stored fingerprint template is may be directly used at this time) and exports the fingerprint identification from the device and stores the fingerprint identification and user information provided by the operating system correspondingly in the terminal; in the fingerprint verifying process, it is started to collect fingerprint information via the fingerprint verifying instruction and it is determined whether the collected fingerprint information and the stored fingerprint template are matched, if they are matched, computation is performed on the matched fingerprint template to obtain a fingerprint identification and return the fingerprint identification to the terminal; and the terminal cyclically compares the fingerprint identification and the fingerprint identification stored in the database, if there is a matched fingerprint identification, the fingerprint identification can be used as user information for login and the user information is permitted to login the system.

Embodiment 3

Figure 5:
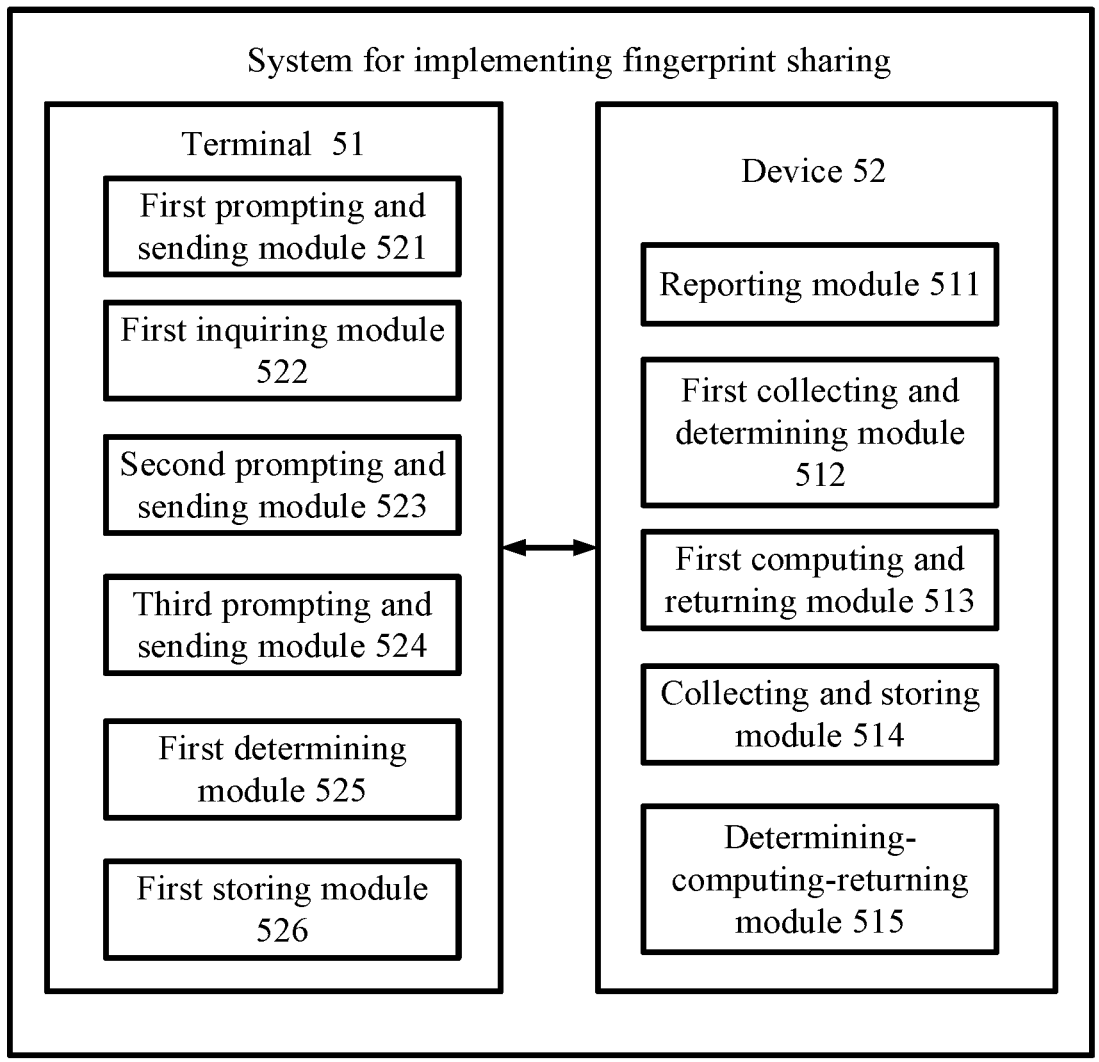
FIG. 5 is a block diagram of a system for implementing fingerprint sharing provided by Embodiment 3 of the present disclosure.

The embodiment of the present disclosure provides a system for implementing fingerprint sharing. As shown by FIG. 5, the system includes a terminal 51 and a device 52, the device 52 includes: a reporting module 511, a first collecting and determining module 512, a first computing and returning module 513, a collecting and storing module 514 and a determining-computing-returning module 515; and the terminal 51 includes: a first prompting and sending module 521, a first inquiring module 522, a second prompting and sending module 523, a third prompting and sending module 524, a first determining module 525 and a first storing module 526.

The reporting module 511 is configured to, when the device 52 builds a connection with the terminal 51, report to the terminal that the device 52 has a WBF port and an FIDO port to the terminal 51.

The first prompting and sending module 521 is configured to, when the terminal 51 receives WBF register information triggered by a user, prompt the user to input a fingerprint and send a fingerprint verifying instruction to the device 52 via the WBF port.

The first collecting and determining module 512 is configured to receive the fingerprint verifying instruction, start to collect fingerprint information and determine whether the collected fingerprint information matches the stored fingerprint template, if yes, trigger the first computing and returning module 513, if no, return information that verification is failed to the terminal 51 via the WBF port and trigger the third prompting and sending module 524.

The first computing and returning module 513 is configure to perform computation on the matched fingerprint template to obtain a fingerprint identification and return the generated fingerprint identification to the terminal 51 via the WBF port.

The first enquiring module 522 is configured to, when receiving the fingerprint identification, inquire a database to determine whether user information corresponding to the fingerprint identification is stored in the database, if yes, trigger the second prompting and sending module 523 if no, trigger the third prompting and sending module 524.

The second prompting and sending module 523 is configured to prompt the user to replace a fingerprint and send a fingerprint registering instruction to the device 52 via the WBF port, trigger the collecting and storing module 514.

The third prompting and sending module 524 is configured to prompt the user to input fingerprint and send a fingerprint registering instruction to the device 52 via the WBF port and trigger the collecting and storing module 514.

The collecting and storing module 514 is configured to receive the fingerprint registering instruction, start to collect fingerprint information and store the collected fingerprint information.

The determining-computing-returning module 515 is configured to determine whether collection of fingerprint information is completed, if yes, generate a fingerprint template according to the stored fingerprint information, perform computation on the generated fingerprint template to obtain a fingerprint identification, return the fingerprint identification to the terminal 51 via the WBF port and set identification indicating that fingerprint is registered in the FIDO configuration, trigger the first determining module 525, if no, return information that collection is uncompleted to the terminal 51 via the WBF port and trigger the first determining module 525.

The first determining module 525 is configured to perform a determination on the received information, if the received information is the fingerprint identification, trigger the first storing module 526, and if the received information is that collection is uncompleted, trigger the third prompting and sending module 524.

The first storing module 526 is configured to store the user information provided by the operating system and the fingerprint identification correspondingly in the database.

Specifically, in the present embodiment, the determining-computing-returning module 515 is specifically configured to update remained collecting times and determine whether current remained collecting times is a collecting threshold value, if yes, generate a fingerprint template according to the stored fingerprint information and store the fingerprint template, perform computation on the generated fingerprint template to obtain a fingerprint identification, return the fingerprint identification to the terminal 51 via the WBF port, set an identification indicating the fingerprint is registered in the FIDO configuration, trigger the first determining module 525, if no, return information that collection is uncompleted to the terminal 52 via the WBF port and trigger the first determining module 525.

Specifically, in the present embodiment, the collecting and storing module 514 includes:
  a receiving and collecting unit, configured to receive the fingerprint registering instruction and start to collect fingerprint information;
  a first determining unit, configured to determine whether a collecting state is successful collecting, if yes, store the collected fingerprint information, trigger the determining-computing-returning module 515, if no, return information that collection is failed to the terminal via the WBF port, trigger the first determining module; and
  the determining-computing-returning module 515 is further configured to, after completing collecting fingerprint information, return current remained collecting times to the terminal via the WBF port.

Correspondingly, the first determining module 525 includes:
  a third determining unit, configured to determine whether the fingerprint identification and remained collecting times are received, if yes, trigger a fourth determining unit, if no, trigger a third prompting and sending module 524; and
  a fourth determining unit, configured to determine whether the remained collecting times is a collecting threshold value, if yes, trigger a first storing module 526, if no, trigger a third prompting and sending module 524.

In the present embodiment, the second prompting module is specifically configured to prompt a user to replace a fingerprint, when receiving information of confirming replacing, send a fingerprint registering instruction to the device 52 via the WBF port, trigger the collecting and storing module 514.

In the present embodiment, the first computing and returning module 513 is configured to perform computation on the matched fingerprint template to obtain the fingerprint identification is specifically: the first computing and returning module 513 configured to perform hash computation on the matched fingerprint template to obtain the fingerprint identification.

The determining-computing-returning module 515 is configured to perform computation on the generated fingerprint template to obtain the fingerprint identification is specifically: the determining-computing-returning module 515 is configured to perform hash computation on the generated fingerprint template to obtain the fingerprint identification.

Specifically, in the present embodiment, the first enquiring module 522 includes:
  a searching and opening unit, configured to, when receiving the fingerprint identification returned from the device 52, search for a database via a fourth interface and open the database via a fifth interface;
  a first searching and taking-as unit, configured to take a first record in the found database as a current record via a sixth interface;
  an obtaining and determining unit, configured to obtain content of the current record via a seventh interface, determine whether the content of the obtained current record matches the received fingerprint identification, if yes, trigger the second prompting and sending module 523 if no, trigger the fifth determining unit;
  the fifth determining unit, configured to determine whether an unprocessed record exists in the database, if yes, trigger a second searching and taking-as unit, if no, trigger the third prompting and sending module 524;
  the second searching and taking-as unit, configured to take a next record in the found database as the current record via an eighth interface and trigger the obtaining and determining unit.

In an implementation, the terminal 51 in the present embodiment further includes: a second determining module, a fourth prompting and sending module, a first receiving and searching module and a permitting module; and the device 52 further includes: a second collecting and determining module and a second computing and returning module.

The second determining module is configured to, when the terminal 51 receives login information, determines a login manner selected by the user, if the login manner is the WBF fingerprint login type, trigger the fourth prompting and sending module.

The fourth prompting and sending module is configured to prompt the user to input a fingerprint and send a fingerprint verifying instruction to the connected device 52 via the WBF port.

The second collecting and determining module is configured to receive the fingerprint verifying instruction, start to collect fingerprint information, determine whether the collected fingerprint information matches the stored fingerprint template, if yes, trigger the second computing and returning module, if no, report an error, and the procedure is ended.

The second computing and returning module is configured to perform computation on the matched fingerprint template to obtain a fingerprint identification and return the fingerprint identification to the terminal 51 via the WBF port.

The first receiving and searching module is configured to, when receiving the fingerprint identification returned from the device 52, search for corresponded user information in the database according to the fingerprint identification, if the user information is found, trigger the permitting module, if the user information is not found, report an error, and the procedure is ended.

The permitting module is configured to permit a user corresponding to the user information to perform a current operation.

In the present embodiment, the terminal 51 further includes: a first sending module, a third determining module, a fourth determining module, a second sending module and a fifth determining module; and the device 52 further includes: a first returning module and a third collecting and determining module.

The first sending module is configured to, when the terminal 51 receives FIDO register credential information triggered by the user, send a device information obtaining instruction to a connected device 52 via the FIDO port.

The first returning module is configured to return a device information response to the terminal 51 via the FIDO port.

The third determining module is configured to, determine whether the connected device 52 supports a fingerprint operation according to the received device information response, if yes, trigger the fourth determining module, if no, perform a non-fingerprint FIDO register credential process.

The fourth determining module is configured to determine whether a fingerprint template is stored in the device 52 according to the received device information response, if yes, trigger the second sending module, if no, perform a non-fingerprint FIDO register credential process.

The second sending module is configured to send an FIDO registering instruction to the connected device 52 via the FIDO port.

The third collecting and determining module is configured to receive the FIDO registering instruction, start to collect fingerprint information, determine whether the collected fingerprint information matches the stored fingerprint template, if yes, return information that register is successful to the terminal 51 via the FIDO port, trigger the fifth determining module, if no, return information that register is failed to the terminal 51 via the FIDO port, trigger the fifth determining module.

The fifth determining module is configured to determine a type of the received information, if the received information is that registering is successful, keep on performing an FIDO register credential operation, if the information is that register is failed, report an error and the procedure is ended.

The device information response of the present embodiment includes an identification indicating that fingerprint is registered in the FIDO configuration.

The fourth determining module is specifically configured to determine whether the received device information response includes an identification that fingerprint is registered, if yes, trigger the second sending module, if no, report an error and the procedure is ended.

Embodiment 4

Figure 6:
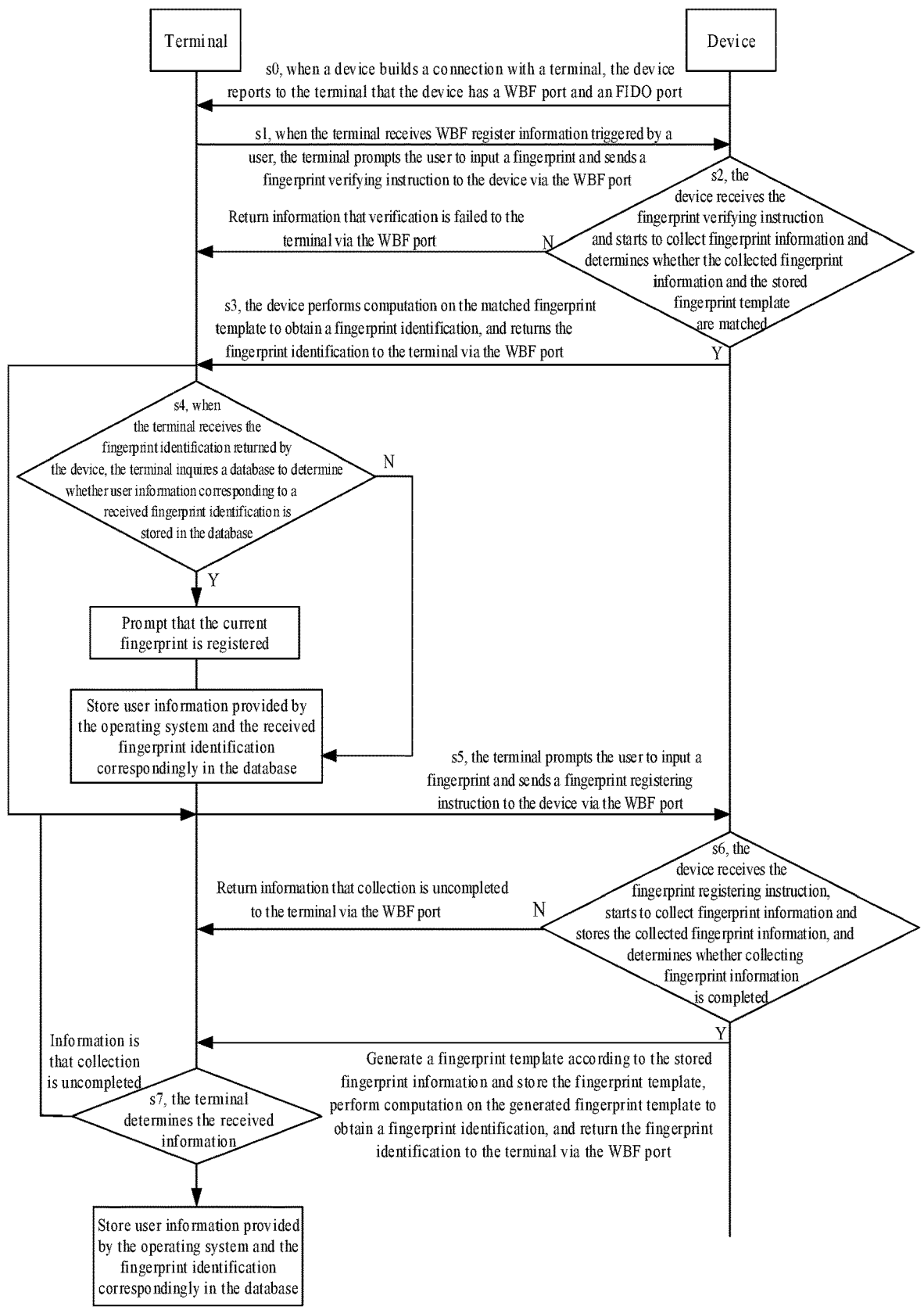
FIG. 6 is a flow chart of a method for implementing fingerprint sharing provided by Embodiment 4 of the present disclosure.

Embodiment 4 of the present disclosure provides a method for implementing fingerprint sharing, as shown by FIG. 6, the method includes the following.

Step s0, when a device builds a connection with a terminal, the device reports to the terminal that the device has a WBF port and an FIDO port.

Step s1, when the terminal receives WBF register information triggered by a user, the terminal prompts a user to input a fingerprint and sends a fingerprint verifying instruction to the device via the WBF port.

In the present embodiment, before Step s1, the method further includes: when the terminal detects that a user triggers an application and the type of the application is WBF application, Step s1 is executed.

Step s2, the device receives a fingerprint verifying instruction, starts to collect fingerprint information and determines whether the collected fingerprint information and the stored fingerprint template are matched, if yes, executes Step s3, if no, returns information that verification is failed to the terminal via the WBF port, executes Step s5.

In the present embodiment, the stored fingerprint template is stored in a process of registering a fingerprint via the WBF port or via the FIDO port.

Step s3, the device performs computation on the matched fingerprint template to obtain a fingerprint identification and returns the fingerprint identification to the terminal via the WBF port.

In an implementation, Step s3 includes: the device performs hash computation on the matched fingerprint template to obtain a fingerprint identification and returns the fingerprint identification to the terminal via the WBF port.

Step s4, when the terminal receives the fingerprint identification returned by the device, the terminal inquires a database to determine whether user information corresponding to a received fingerprint identification is stored in the database, if yes, prompts that a current fingerprint is registered already, if no, stores the user information provided by an operating system and the received fingerprint identification correspondingly in the database.

Specifically, in the present embodiment, Step s4 includes:

Step s4-1, when the terminal receives the fingerprint identification returned by the device, the terminal searches for a database via a fourth interface and opens the database via a fifth interface;

Step s4-2, the terminal takes a first record in the found database as current record via a sixth interface;

Step s4-3, the terminal obtains content of the current record via a seventh interface, determines whether the content of the obtained current record matches the received fingerprint identification, if yes, the terminal prompts that the current fingerprint is registered, if no, executes Step s4-4.

Step s4-4, the terminal determines whether an unprocessed record exists in the database, if yes, executes Step s4-5; if no, the terminal stores the user information provided by the operating system and the received fingerprint identification correspondingly in the database;

Step s4-5, the terminal takes a next record in the found database as a current record via an eighth interface, goes back to Step s4-3.

Step s5, the terminal prompts the user to input a fingerprint and sends a fingerprint registering instruction to the device via the WBF port.

Step s6, the device receives the fingerprint registering instruction, starts to collect fingerprint information and stores the collected fingerprint information, and determines whether collecting fingerprint information is completed, if yes, generates a fingerprint template according to the stored fingerprint information and store the generated fingerprint template, performs computation on the generated fingerprint template to obtain a fingerprint identification, returns the fingerprint identification to the terminal via the WBF port, executes Step s7; and if no, returns information that collection is uncompleted to the terminal via the WBF port, executes Step s7.

In an implementation, performing computation on the generated fingerprint template to obtain a fingerprint identification in Step s6 includes: performing hash computation on the generated fingerprint template to obtain a fingerprint identification.

Specifically, Step s6 includes the following.

Step d1, the device receives the fingerprint registering instruction and starts to collect fingerprint information and stores the collected fingerprint information.

In the present embodiment, Step d1 includes:

Step d1-1, the device receives a fingerprint registering instruction and starts to collect the fingerprint information;

Step d1-2, the device determines whether the collecting state is successful collecting, if yes, stores the collected fingerprint information, executes Step d2, if no, returns information that collection is failed to the terminal via the WBF port, and executes Step s7.

Step d2, the device updates remained collecting times, determines whether the current remained collecting times is a collecting threshold value, if yes, executes Step d3, if no, returns information that collection is uncompleted to the terminal via the WBF port, and executes Step s7.

Step d3, the device generates a fingerprint template according to the stored fingerprint information and stores the fingerprint template, performs computation on the generated fingerprint template to obtain a fingerprint identification, returns the fingerprint identification to the terminal via the WBF port, executes Step s7.

In an implementation, Step d3 in the present embodiment further includes: the device returns current remained collecting times to the terminal via the WBF port.

Step s7, the terminal determines the received information, if the received information is fingerprint identification, the terminal stores the user information provided by the operating system and the fingerprint identification correspondingly in the database, if the received information is that collection is uncompleted, goes back to Step s5.

In the present embodiment, Step s7 includes:

Step p1, the terminal determines whether receiving the fingerprint identification and the remained collecting times, if yes, executes Step p2, if no, goes back to Step s5;

Step p2, the terminal determines whether the remained collecting times is a collecting threshold value, if yes, stores the user information provided by the operating system and the fingerprint identification correspondingly in the database, if no, goes back to Step s5.

In an implementation, after Step s0, the method of the present embodiment further includes:

if the type of the application is the WBF application and the type of the trigger information of which the user triggers the application is WBF login information, Step a1 is executed;

Step a1, the terminal prompts the user to input a fingerprint and sends a fingerprint verifying instruction to the device via the WBF port;

Step a2, the device receives the fingerprint verifying instruction, starts to collect fingerprint information, determines whether the collected fingerprint information matches a stored fingerprint template, if yes, executes Step a3, if no, reports an error and the procedure is ended.

Step a3, the device performs computation on the matched fingerprint template to obtain a fingerprint identification, returns the fingerprint identification to the terminal via the WBF port;

Step a4, when the terminal receives the fingerprint identification returned from the device, the terminal inquires the database to determine whether user information corresponding to the fingerprint identification is stored in the database, if yes, executes Step a5, if no, reports an error and the procedure is ended.

Step a5, the terminal obtains the user information corresponding to the received fingerprint identification and permits a user corresponding to the user information to perform a login operation.

After Step s0, the method in the present embodiment further includes:

Step b1, when the terminal detects that a user triggers an application, a type of the application is an FIDO application and a type of triggering information of which the user triggers an application is FIDO register information, executes Step b2;

Step b2, the terminal obtains a device information response from the connected device via the FIDO port;

Step b3, the terminal determines whether the connected device supports an FIDO operation according to the received device information response, if yes, executes Step b4, if no, reports an error and the procedure is ended.

Step b4, the terminal obtains a device attribution response from the connected device via the FIDO port;

Step b5, the terminal determines whether the connected device supports a fingerprint operation according to the received device attribution response, if yes, executes Step b6, if no, performs a non-fingerprint FIDO register process;

Step b6, the terminal prompts the user to input a PIN code, when the terminal receives the PIN code input by the user, the terminal generates a PIN code verifying instruction according to the PIN code and sends the PIN code verifying instruction to the connected device via the FIDO port;

Step b7, the device verifies the PIN code in the PIN code verifying instruction, if verification is successful, the device returns information that verification is successful to the terminal via the FIDO port, executes Step b8, if verification is failed, the device returns information that verification is failed to the terminal via the FIDO port;

Step b8, the terminal sends a fingerprint registering instruction to the connected device via the FIDO port;

Step b9, the device starts to collect fingerprint information after receiving the fingerprint registering instruction and stores the collected fingerprint information, determines whether collecting fingerprint information is completed, if yes, generates a fingerprint template according to the stored fingerprint information and stores the fingerprint template, returns information that collection is completed to the terminal via the FIDO port, executes Step b10, if no, returns information that collection is uncompleted to the terminal via the FIDO port, executes Step b10;

Step b10, the terminal determines whether a register process is completed according to information returned from the device, if yes, prompts that fingerprint register is successful, if no, goes back to Step b8.

In an implementation,

Step b9 includes:

Step t0, after receiving the fingerprint registering instruction, the device starts to collect fingerprint information;

Step t1, the device determines whether the collecting state is that collection is successful, if yes, the device stores the collected fingerprint information, executes Step t2, if no, the device returns information that collection is failed to the terminal via the FIDO port, executes Step b10;

Step t2, the device updates remained collecting times and determines whether current remained collecting times is a collecting threshold value, if yes, the device generates a fingerprint template according to the stored fingerprint information and stores the fingerprint template, returns information that collection is completed to the terminal via the FIDO port and current remained collecting times, executes Step b10, if no, the device returns information that collection is uncompleted to the terminal via the FIDO port, executes Step b10;

Step b10 includes:

Step b10-1, the terminal determines whether information returned by the device includes information that collection is completed and the remained collecting times, if yes, executes Step b10-2, if no, reports an error and the procedure is ended;

Step b10-2, the terminal determines whether the remained collecting times is a collecting threshold value, if yes, the device prompts that fingerprint register is successful, if no, goes back to Step b8.

The device provided by the present embodiment is a compound device which supports both the FIDO operation and the windows hello fingerprint operation, with a wider range of application, more convenience, and high cost-effectiveness. For the device of the present embodiment, the fingerprint registered via the FIDO application can be used in the windows hello application, which avoids a problem of repetition of registering a fingerprint for the windows hello application and the FIDO application.

Embodiment 5

Figure 7:
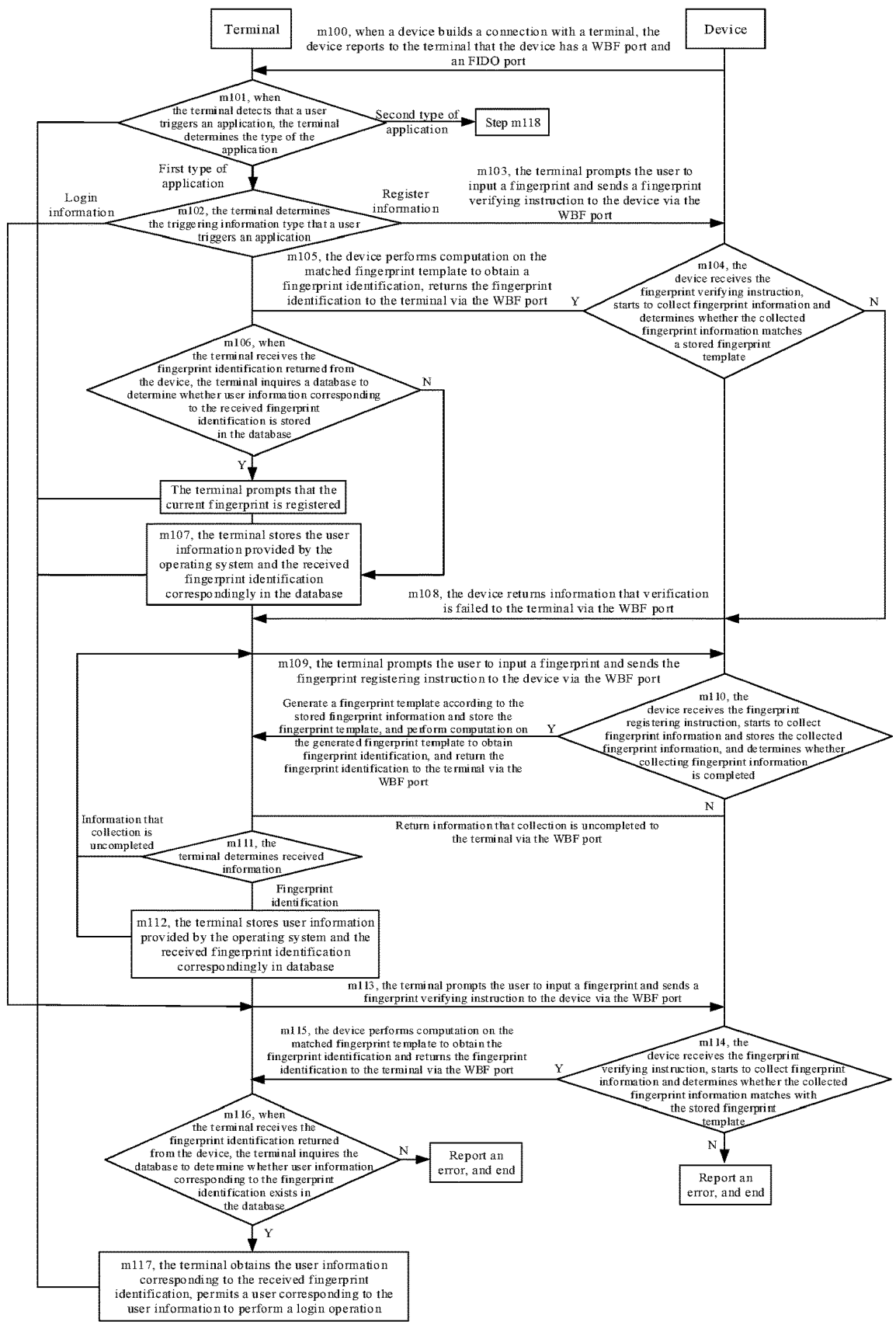
FIG. 7 and FIG. 8 flow charts of a method for implementing fingerprint sharing provided by Embodiment 5 of the present disclosure.
Figure 8:
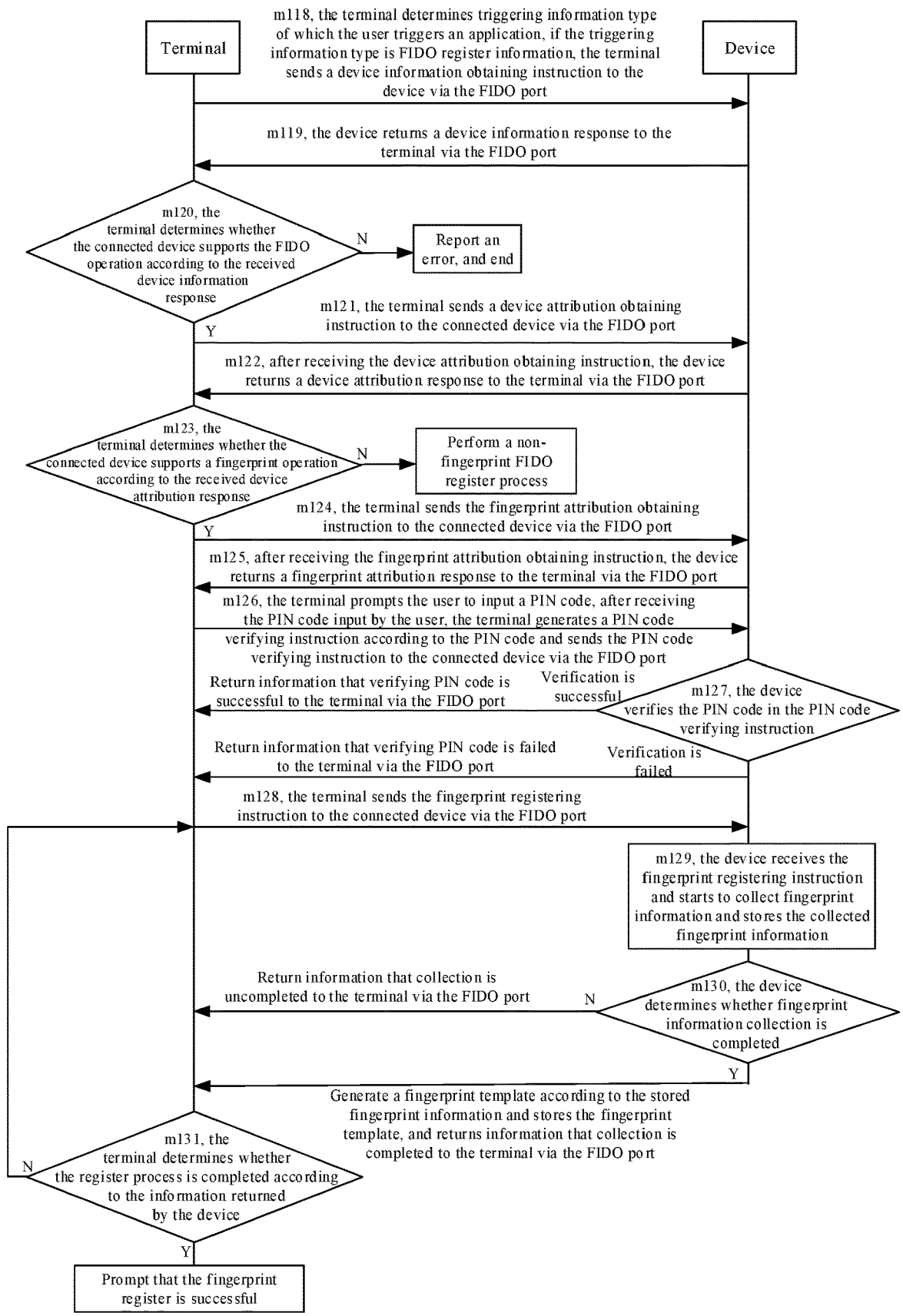

Embodiment 5 of the present disclosure provides a method for implementing fingerprint sharing. As shown by FIG. 7 and FIG. 8, the method includes the following.

Step m100, when a device builds a connection with a terminal, the device reports to the terminal that the device has a WBF port and an FIDO port.

Step m101, when the terminal detects that a user triggers an application, the terminal determines the type of the application, if the application is a first type of application, executes Step m102, if the application is a second type of application, executes Step m118.

Specifically, in the present embodiment, the first type of application is an application which applies fingerprint register and verifying via the WBF port, for example, boot login; and the second type of application is an application which applies fingerprint register and verifying via the FIDO port, for example, a secure key.

Step m102, the terminal determines the triggering information type that a user triggers an application, if the triggering information type is login information, executes Step m113, if the triggering information type is register information, executes Step m103.

The triggering information in the present embodiment includes user information.

Step m103, the terminal prompts the user to input a fingerprint and sends a fingerprint verifying instruction to the device via the WBF port.

Step m104, the device receives the fingerprint verifying instruction, starts to collect fingerprint information and determines whether the collected fingerprint information matches a stored fingerprint template, if yes, executes Step m105, if no, executes Step m108.

In an implementation, before the method of the present embodiment, the user registers a fingerprint to the device and stores a fingerprint template matched the fingerprint; i.e., the terminal sends a fingerprint registering instruction to the device via the WBF port and the FIDO port, the device receives the fingerprint instruction, starts to collect fingerprint information and stores the fingerprint information, generates a fingerprint template according to the stored fingerprint information after completing collecting fingerprint information and stores the fingerprint template.

If no fingerprint template is stored in the device before Step m104, the determining result of Step104 is mismatching, Step m108 is executed.

In the present embodiment, the terminal invokes a first interface to activate a fingerprint collecting process, invokes a second interface after completing the collection to end the fingerprint collecting process; specifically, the first interface in the present embodiment is a fingerprint collecting activating interface, and the second interface in the present embodiment is a fingerprint collecting ending interface.

For example, the first interface is:

```
SensorAdapterStartCapture(
    _Inout_ PWINBIO_PIPELINE Pipeline,
    _In_ WINBIO_BIR_PURPOSE Purpose,
    _Out_ LPOVERLAPPED *Overlapped
);
the second interface is:
SensorAdapterFinishCapture(
    _Inout_ PWINBIO_PIPELINE Pipeline,
    _Out_ PWINBIO_REJECT_DETAIL RejectDetail
).
```

Step m105, the device performs computation on the matched fingerprint template to obtain a fingerprint identification, returns the fingerprint identification to the terminal via the WBF port.

Preferably, in the present embodiment, Step m105 includes: the device performs hash computation on the matched fingerprint template to obtain a hash value, takes the hash value as a fingerprint identification, and returns the fingerprint identification to the terminal via the WBF port.

In the present embodiment, the device invokes a third interface to perform computation on the matched fingerprint template; specifically, the third interface is a fingerprint computing interface, for example, the third interface is:

```
EngineAdapterIdentifyFeatureSet (
    _Inout_ PWINBIO_PIPELINE Pipeline,
    _Out_ PWINBIO_IDENTITY Identity,
    _Out_ PWINBIO_BIOMETRIC_SUBTYPE SubFactor,
    _Out_ PUCHAR *PayloadBlob,
    _Out_ PSIZE_T PayloadBlobSize,
    _Out_ PUCHAR *HashValue,
    _Out_ PSIZE_T HashSize,
    _Out_ PWINBIO_REJECT_DETAIL RejectDetail
)
```

Step m106, when the terminal receives the fingerprint identification returned from the device, the terminal inquires a database to determine whether user information corresponding to the received fingerprint identification is stored in the database, if yes, the terminal prompts that the current fingerprint is registered, goes back to Step m101, if no, executes Step m107.

Specifically, in the present embodiment, Step m106 includes the following.

Step m106-1, when the terminal receives the fingerprint identification returned from the device, the terminal searches for a database via a fourth interface and opens the database via a fifth interface.

Specifically, the fourth interface in the present embodiment is a database searching interface and the fifth interface is a database opening interface.

For example, the fourth interface is:

```
StorageAdapterQueryBySubject(
    _Inout_ PWINBIO_PIPELINE Pipeline,
    _In_ PWINBIO_IDENTITY Identity,
    _In_ WINBIO_BIOMETRIC_SUBTYPE SubFactor
);
the fifth interface is:
StorageAdapterOpenDatabase(
    _Inout_ PWINBIO_PIPELINE Pipeline,
    _In_ PWINBIO_UUID DatabaseId,
    _In_ LPCWSTR FilePath,
    _In_ LPCWSTR ConnectString
).
```

Step m106-2, the terminal takes a first record in the found database as current record via a sixth interface.

Specifically, the sixth interface in the present embodiment is a first record searching record, for example, the sixth interface is:

```
StorageAdapterFirstRecord(
    _Inout_ PWINBIO_PIPELINE Pipeline
).
```

Step m106-3, the terminal obtains content of the current record via a seventh interface, determines whether the content of the obtained current record matches the received fingerprint identification, if yes, the terminal prompts that current fingerprint is registered, if no, executes Step m106-4.

Specifically, the seventh interface in the present embodiment is a record content obtaining interface, for example, the seventh interface is:

```
StorageAdapterGetCurrentRecord(
    _Inout_ PWINBIO_PIPELINE Pipeline,
    _Out_ PWINBIO_STORAGE_RECORD RecordContents
).
```

Step m106-4, the terminal determines whether an unprocessed record exists in the database, if yes, executes Step m106-5, if no, executes Step m107.

Step m106-5, the terminal takes a next record in the found database as the current record via an eighth interface, goes back to Step m106-3.

Specifically, the eighth interface in the present embodiment is a next record searching interface, for example, the eighth interface is:

```
StorageAdapterNextRecord(
    _Inout_ PWINBIO_PIPELINE Pipeline
).
```

Step m107, the terminal stores the user information provided by the operating system and the received fingerprint identification correspondingly in the database, goes back to Step m101.

Step m108, the device returns information that verification is failed to the terminal via the WBF port, executes Step m109.

Step m109, the terminal prompts the user to input a fingerprint and sends the fingerprint registering instruction to the device via the WBF port.

Step m110, the device receives the fingerprint registering instruction, starts to collect fingerprint information and stores the collected fingerprint information, determines whether collecting fingerprint information is completed, if yes, generates a fingerprint template according to the stored fingerprint information and stores the fingerprint template, performs computation on the generated fingerprint template to obtain a fingerprint identification, returns the fingerprint identification to the terminal via the WBF port, executes Step m111, if no, the device returns information that collection is uncompleted to the terminal via the WBF port, executes Step m111.

In the present embodiment, the starting to collect the fingerprint information and storing the collected fingerprint information, determining whether collecting the fingerprint information is completed specifically includes the following.

Step a0, starting to collect the fingerprint information.

Step a1, determining whether the collecting state is successful collecting, if yes, storing the collected fingerprint information, executing Step a2, if no, returning information that collection is failed to the terminal via the WBF port, executing Step m111.

Step a2, updating remained collecting times and determines whether the current remained collecting times is a preset value, if yes, collecting fingerprint information is completed, if no, collecting fingerprint information is uncompleted.

Step m111, the terminal determines received information, if the received information is a fingerprint identification, executes Step m112, if the received information is that collection is uncompleted, goes back to Step m109.

Step m112, the terminal stores user information provided by the operating system and the received fingerprint identification correspondingly in database, goes back to Step m101.

For example, in the present embodiment, the information stored in the database includes: the user information and the fingerprint identification.

Step m113, the terminal prompts the user to input a fingerprint and sends a fingerprint verifying instruction to the device via the WBF port.

In the present embodiment, the terminal invokes the first interface to activate a fingerprint collecting process and invokes the second interface to end the fingerprint collecting process after collection is completed.

Step m114, the device receives the fingerprint verifying instruction, starts to collect fingerprint information and determines whether the collected fingerprint information matches the stored fingerprint template, if yes, executes Step m115, if no, reports an error, the procedure is ended.

Step m115, the device performs computation on the matched fingerprint template to obtain the fingerprint identification and returns the fingerprint identification to the terminal via the WBF port.

In the present embodiment, the device invokes the third interface to perform computation on the matched fingerprint template.

Step m116, when the terminal receives the fingerprint identification returned from the device, the terminal inquires the database to determine whether user information corresponding to the fingerprint identification exists in the database, if yes, executes Step m117, if no, report an error, the procedure is ended.

Step m117, the terminal obtains the user information corresponding to the received fingerprint identification, permits a user corresponding to the user information to perform a login operation, goes back to Step m101.

Step m118, the terminal determines the triggering information type that the user triggers an application, if the triggering information type is FIDO register information, the terminal sends a device information obtaining instruction to the device via the FIDO port.

Step m119, the device returns a device information response to the terminal via the FIDO port.

Step m120, the terminal determines whether the connected device supports the FIDO operation according to the received device information response, if yes, executes Step m121, if no, reports an error, the procedure is ended.

Specifically, in the present embodiment, Step m120 includes: the terminal determines whether the received device information response includes information that device supports the FIDO operation, if yes, executes Step m121, if no, reports an error, the procedure is ended.

Step m121, the terminal sends a device attribution obtaining instruction to the connected device via the FIDO port.

Step m122, after receiving the device attribution obtaining instruction, the device returns a device attribution response to the terminal via the FIDO port.

Specifically, the device attribution response in the present embodiment can include supporting/not supporting the fingerprint operation.

Step m123, the terminal determines whether the connected device supports a fingerprint operation according to the received device attribution response, if yes, executes Step m124, if no, performs a non-fingerprint FIDO register process.

Specifically, in the present embodiment, Step m123 includes: the terminal determines whether the received device attribution response includes information that the device supports the fingerprint operation, if yes, executes Step m124, if no, performs a non-fingerprint FIDO register process.

In the present embodiment, non-Fingerprint FIDO register process is the prior art, and no more detail is given here.

Step m124, the terminal sends the fingerprint attribution obtaining instruction to the connected device via the FIDO port.

Step m125, after receiving the fingerprint attribution obtaining instruction, the device returns a fingerprint attribution response to the terminal via the FIDO port.

Specifically, the fingerprint attribution response in the present embodiment includes the type of the collected fingerprint supported by the device, for example, pressing or scanning, and remained collecting times.

Step m126, the terminal prompts the user to input a PIN code, after receiving the PIN code input by the user, the terminal generates a PIN code verifying instruction according to the PIN code and sends the PIN code verifying instruction to the connected device via the FIDO port.

Step m127, the device verifies the PIN code in the PIN code verifying instruction, if verification is successful, the device sends information that verifying PIN code is successful to the terminal via the FIDO port, executes Step m128, if verification is failed, the device sends information that verifying PIN code is failed to the terminal via the FIDO port.

Specifically, in the present embodiment, Step m127 includes: the device determines whether the PIN code in the PIN code verifying instruction matches a stored PIN code, if yes, the device returns information that verifying user identity is successful to the terminal via the FIDO port, executes Step m128, if no, the device returns information that verifying PIN code is failed to the terminal via the FIDO port.

In an implementation, between Step m127 and Step m128, the method further includes: when the terminal receives information that verifying PIN code is failed, the terminal updates PIN code retry times, determines whether PIN code retry times is preset times, if yes, reports an error, if no, goes back to Step m126.

Correspondingly, before Step m126, the method further includes: the terminal sends a PIN code retry times obtaining instruction to the connected device; and the device receives the PIN code retry times obtaining instruction and returns the PIN code retry times to the terminal.

Step m128, the terminal sends the fingerprint registering instruction to the connected device via the FIDO port.

Step m129, the device receives the fingerprint registering instruction and starts to collect fingerprint information and stores the collected fingerprint information.

In the present embodiment, Step m129 includes:

Step m129-1, the device receives a fingerprint registering instruction and starts to collect fingerprint information; and Step m129-2, the device determines whether collecting state is successful collecting, if yes, the device stores the collected fingerprint information, executes Step m130, if no, the device returns information that collection is failed to the terminal via the WBF port, executes Step m131.

Step m130, the device determines whether collecting fingerprint information is completed, if yes, the device generates a fingerprint template according to the stored fingerprint information and stores the fingerprint template, returns information that collection is completed to the terminal via the FIDO port, executes Step m131, if no, the device returns information that collection is uncompleted to the terminal via the FIDO port, executes Step m131.

In the present embodiment, Step m130 includes: the device updates remained collecting times and determines whether current remained collecting times is a collecting threshold value, if yes, the device generates a fingerprint template according to the stored fingerprint information and stores the fingerprint template, returns information that collection is completed to the terminal via the FIDO port, executes Step m131, if no, the device returns information that collection is uncompleted to the terminal via the FIDO port, executes Step m131.

In an implementation, Step m130 of the present embodiment further includes: the device returns current remained collecting times to the terminal via the FIDO port.

In an implementation, if an initial value of the remained collecting times is N, which is an integer greater than 0, the collecting threshold value is 0, the remained collecting times is updated to deduct 1 from the remained collecting times.

In an implementation, the remained collecting times can be times for completed collecting. For example, if the initial value of the times for completed collection is 0, the collecting threshold value is N, which is an integer greater than 0, the times for completed collection is updated to add 1 to the times for completed collecting.

Step m131, the terminal determines whether a register process is completed according to the information returned by the device, if yes, the terminal prompts that fingerprint register is successful, if no, goes back to Step m128.

In the present embodiment, Step m131 includes:

Step m131-1, the terminal determines whether the information returned by the device includes information that collection is completed and the remained collecting times, if yes, executes Step m131-2, if no, reports an error, the procedure is ended;

Step m131-2, the terminal determines whether the remained collecting times is a collecting threshold value, if yes, the procedure is ended, if no, goes back to Step m128.

In the present embodiment, the device provided is a compound device which supports both the FIDO operation and the windows hello fingerprint operation and is used widely, convenient and cost-effective. The fingerprint registered though the device via an FIDO application can be used in the windows hello application, which avoids problem of repeating of registering a fingerprint for the windows hello application and the FIDO application and improves compatibility of the device.

In the method of the present embodiment, in the fingerprint register process, the terminal sends a fingerprint verifying instruction to the device at first, the device prompts the user to start to collect fingerprint information after receiving the fingerprint verifying instruction, determines whether the collected fingerprint information and a stored fingerprint template are matched, where the fingerprint template can be stored after the fingerprint is registered successfully in the FIDO application or the fingerprint template can also be stored after fingerprint is registered successfully in the WBF application, if the collected fingerprint information and the stored fingerprint template are matched, it represents that the fingerprint information has been collected by the device already, the device performs computation on the matched fingerprint template to obtain a fingerprint identification and sends the fingerprint identification to the terminal, the terminal determines whether corresponding user information is stored in the database, if yes, it represents that the fingerprint is registered in the windows hello application already, otherwise, it represents that the fingerprint is registered in the FIDO application already. If the device determines that the collected fingerprint information and the stored fingerprint template are not matched, the terminal sends a fingerprint registering instruction to the terminal, the device starts to collect fingerprint information after receiving the fingerprint registering instruction and stores the collected fingerprint information, generates a fingerprint template according to the stored fingerprint information after collecting fingerprint information is completed and stores the fingerprint template, performs computation on the fingerprint template to obtain a fingerprint identification and exports the fingerprint identification from the device, the exported fingerprint identification and the user information provided by the operating system are stored correspondingly in the terminal. Because original data of the fingerprint information is not exported and the fingerprint identification is regarded as a medium and unique associated information, which improves security of device. In the process of verifying the fingerprint, it is started to collect the fingerprint information collected via the fingerprint verifying instruction and match the collected fingerprint information with the stored fingerprint template, where the fingerprint template can be stored after the fingerprint is registered successfully in the FIDO application or the fingerprint template can also be stored after fingerprint is registered successfully in the WBF application, if the comparing result is successful, a fingerprint identification obtained by performing computation on the matched fingerprint template is returned to the terminal, the terminal compares the fingerprint identification and the fingerprint identification stored in the database circularly, if a fingerprint identification is matched successfully, the fingerprint identification can be regarded as a legitimate login credential, the user information corresponding to the fingerprint identification can be permitted to perform system login.

Embodiment 6

Figure 9:
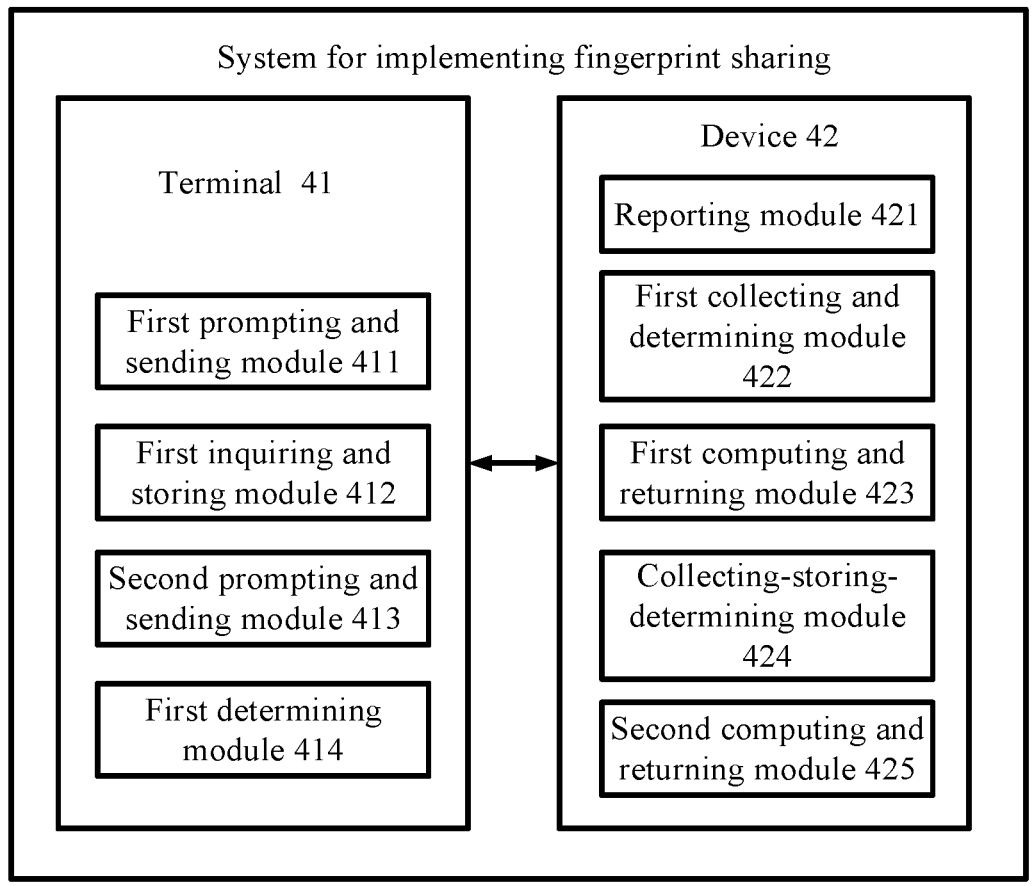
FIG. 9 is a block diagram for a system for implementing fingerprint sharing provided by Embodiment 6 of the present disclosure.

Embodiment 6 of the present embodiment provides a system for implementing fingerprint sharing. As shown by FIG. 9, the system includes a terminal 41 and a device 42.

The terminal 41 includes a first prompting and sending module 411, a first inquiring and storing module 412, a second prompting and sending module 413 and a first determining module 414.

The device 42 includes a reporting module 421, a first collecting and determining module 422, a first computing and returning module 423, a collecting-storing-determining module 424 and a second computing and returning module 425.

The reporting module 421 is configured to, when the device 42 builds a connection with the terminal 42, reports to the terminal that the device 42 has a WBF port and an FIDO port.

The first prompting and sending module 411 is configured to, when the terminal 41 receives WBF register information triggered by a user, prompt a user to input a fingerprint and send a fingerprint verifying instruction to the device 42 via the WBF port.

The first collecting and determining module 422 is configured to receive a fingerprint verifying instruction, start to collect fingerprint information and determine whether the collected fingerprint information and the stored fingerprint template are matched, if yes, triggers the first computing and returning module 423, if no, returns information that verification is failed to the terminal 41 via the WBF port, and triggers the second prompting and sending module 413.

Specifically, the fingerprint template stored in the present embodiment is stored in a process of registering a fingerprint via the WBF port or via the FIDO port.

The first computing and returning module 423 is configured to perform computation on the matched fingerprint template to obtain a fingerprint identification and return the fingerprint identification to the terminal 41 via the WBF port.

The first inquiring and storing module 412 is configured to, when the fingerprint identification returned by the device is received, inquire a database to determine whether user information corresponding to the received fingerprint identification is stored in the database, if yes, prompt that current fingerprint is registered already, if no, store the user information provided by the operating system and the received fingerprint identification correspondingly in the database.

The second prompting and sending module 413 is configured to prompt the user to input a fingerprint and send a fingerprint registering instruction to the device 42 via the WBF port.

The collecting-storing-determining module 424 is configured to receive the fingerprint registering instruction, start to collect fingerprint information and store the collected fingerprint information, determine whether collecting fingerprint information is completed, if yes, trigger the second computing and returning module 425, if no, return information that collection is uncompleted to the terminal 41 via the WBF port and trigger the first determining module 414.

The second computing and returning module 425 is configured to generate a fingerprint template according to the stored fingerprint information and stores the generated fingerprint template, perform computation on the generated fingerprint template to obtain a fingerprint identification, return the fingerprint identification to the terminal 41 via the WBF port, and trigger the first determining module 414.

The first determining module 414 is configured to perform a determination on the received information, if the received information is a fingerprint identification, store the user information provided by the operating system and the fingerprint identification correspondingly into the database, if the received information is that collection is uncompleted, trigger the second prompting and sending module 413.

In the present embodiment, the terminal 41 further includes:

a first detecting module, configured to, when detecting that a user triggers an application and the type of the application is a WBF application, trigger the first prompting and sending module 411.

In the present embodiment, the terminal 41 further includes: a third prompting and sending module, a receiving and inquiring module and an obtaining and permitting module; and the device 42 further includes a second collecting and determining module and a third computing and returning module.

The third prompting and sending module is configured to, if the type of the application is a WBF application and the type of the trigger information of which the user triggers the application is WBF login information, prompt the user to input a fingerprint and send a fingerprint verifying instruction to the device 42 via the WBF port.

The second collecting and determining module is configured to receive the fingerprint verifying instruction, start to collect fingerprint information, determine whether the collected fingerprint information matches the stored fingerprint template, if yes, trigger the first computing and returning module 423, if no, reports an error and the procedure is ended.

The third computing and returning module is configured to perform computation on the matched fingerprint template to obtain a fingerprint identification, and return the fingerprint identification to the terminal 41 via the WBF port.

The receiving and inquiring module is configured to, when receiving the fingerprint identification retuned from the device 42, inquire the database to determine whether user information corresponding to the fingerprint identification stored in the database, if yes, trigger the obtaining and permitting module, if no, reports an error and the procedure is ended.

The obtaining and permitting module is configured to obtain the user information corresponding to the received fingerprint identification and permit a user corresponding to the user information to perform a login operation.

In the present embodiment, the first computing and returning module 423 is specifically configured to perform a hash computation on the matched fingerprint template to obtain a fingerprint identification and return the fingerprint identification to the terminal 41 via the WBF port.

The second computing and returning module 425 is specifically configured to generate fingerprint template according to the stored fingerprint information and store the generated fingerprint template, perform a hash computation on the generated fingerprint template to obtain a fingerprint identification, return the fingerprint identification to the terminal 41 via the WBF port, and trigger the first determining module 414.

In the present embodiment, the first inquiring and storing module 412 includes:

a searching and opening unit, configured to, when a fingerprint identification returned from the device 42 is received, search for a database via a fourth interface and open the database via a fifth interface;

a first searching unit, configured to take the first record in the found database as a current record via a sixth interface;

an obtaining and determining unit, configured to obtain content of the current record via a seventh interface, determine whether the content of the obtained current record matches the received fingerprint identification, if yes, prompt that the current fingerprint is registered, if no, trigger the first determining and storing unit;

a first determining and storing unit, configured to determine whether an unprocessed record exists in the database, if yes, trigger the second searching unit, if no, store the user information provided by the operating system and the received fingerprint identification correspondingly in the database; and a second searching unit, configured to take a next record in the found database as current record via an eighth interface and trigger the obtaining and determining unit.

In the present embodiment, the collecting-storing-determining module 424 includes: a collecting and storing unit, configured to receive a fingerprint registering instruction, start to collect fingerprint information and store the collected fingerprint information.

In the present embodiment, the collecting and storing unit is specifically configured to receive a fingerprint registering instruction, start to collect the fingerprint information, determine whether a collecting state is successful collecting, if yes, store the collected fingerprint information, trigger a second determining unit, if no, return information that collection is failed to the terminal 41 via the WBF port.

The second determining unit is configured to update remained collecting times, determine whether the current remained collecting times is a collecting threshold value, if yes, trigger the second computing and returning module 425, if no, return information that collection is uncompleted to the terminal via the WBF port, and trigger the first determining module 414.

In an implementation, the second computing and returning module 425 is further configured to return the current remained collecting times to the terminal 41 via the WBF port.

Correspondingly, the first determining module 414 in the present embodiment includes:

a third determining unit, configured to determine whether the fingerprint identification and the remained collecting times are received, if yes, trigger a second determining and storing unit, if no, trigger the second prompting and sending module 413; and the second determining and storing unit, configured to determine whether the remained collecting times is a collecting threshold value, if yes, store the user information provided by the operating system and the fingerprint identification correspondingly in the database, if no, trigger the second prompting and sending module 413.

In the present embodiment, the terminal 41 further includes: a first detecting module, a first obtaining module, a second determining module, a second obtaining module, a third determining module, a generating and sending module, a first sending module and a fifth determining module; and the device 42 further includes a first verifying module, a receiving-collecting-storing module and a fourth determining module.

The first detecting module is configured to, when it is detected that a user triggers an application, such as the type of the application is an FIDO application and the type of triggering information of which the user triggers the application is FIDO register information, trigger the first obtaining module.

The first obtaining module is configured to obtain a device information response from a device 42 connected via the FIDO port.

The second determining module is configured to determine whether the device 42 connected supports the FIDO operation according to the received device information response.

The second obtaining module is configured to obtain a device attribution response from the device 42 connected via the FIDO port.

The third determining module is configured to determine whether the device 42 connected supports a fingerprint operation according to the received device attribution response, if yes, trigger the generating and sending module, if no, perform a non-fingerprint FIDO register process.

The generating and sending module is configured to prompt the user to input a PIN code, when receiving the PIN code input by the user, generate a PIN code verifying instruction according to the PIN code and send the PIN code verifying instruction to the device 42 connected via the FIDO port.

The first verifying module is configured to verify the PIN code in the received PIN code verifying instruction, if verification is successful, return information that verification of the PIN code is successful to the terminal 41 via the FIDO port and trigger the first sending module, if verification is failed, return information that verification of the PIN code is failed to the terminal 41 via the FIDO port.

The first sending module is configured to send a fingerprint registering instruction to the device 42 connected via the FIDO port.

The receiving-collecting-storing module is configured to start to collect fingerprint information after receiving the fingerprint registering instruction and store the collected fingerprint information.

The fourth determining module is configured to determine whether collecting fingerprint information is completed, if yes, generate a fingerprint template according to the stored fingerprint information and store the fingerprint template, return information that collection is completed to the terminal 41 via the FIDO port, trigger the fifth determining module, if no, return information that collection is uncompleted to the terminal 41 via the FIDO port, trigger the fifth determining module.

The fifth determining module is configured to determine whether the register process is completed according to information returned from the device 42, if yes, prompt that the fingerprint register is successful, if no, trigger the first sending module.

In the present embodiment, the terminal 41 further includes a fourth obtaining module configured to obtain a fingerprint attribution response including the collecting threshold value from the device 42 connected via the FIDO port.

The receiving-collecting-storing module is configured to start to collect fingerprint information after receiving the fingerprint registering instruction, determine whether the collecting state is successful collecting, if yes, store the collected fingerprint information, trigger a fourth determining module, if no, return information that collection is failed to the terminal 41 via the FIDO port, trigger the fifth determining module.

The fourth determining module is further configured to send the current remained collecting times to the terminal 41 via the FIDO port.

Correspondingly, the fifth determining module includes:
a fourth determining unit, configured to determine whether the information returned from the device 42 includes information that collection is completed and the remained collecting times, if yes, trigger a fifth determining unit, if no, trigger the first sending module; and a fifth determining unit, configured to determine whether the remained collecting times is a collecting threshold value, if yes, prompt that the fingerprint register is successful, if no, trigger the first sending module.

In an implementation, the embodiment of the present disclosure further provides a device and terminal for implementing fingerprint sharing, where each of the device and the terminal includes at least one processor, a memory and a instruction stored in the memory that can be executed by the at least one processor, the at least one processor executes the instruction to implement the method for implementing fingerprint sharing of the above embodiment. Of course, the memory can be out of the device and the terminal. When the device and the terminal are a chip system, the device and the terminal may be constituted by a chip, or include a chip and other separated elements, which is not limited by the disclosed embodiment. The chip is coupled to the memory and is configured to execute a computer program stored in the memory to execute the method for implementing fingerprint sharing disclosed in the above embodiments.

The Embodiments described above may be fully or partially implemented by using software, hardware, firmware, or any combination thereof. When a software program is used to implement the embodiment, the embodiments may be implemented fully or partially in a form of a computer program product. The computer program product includes one or more computer programs. When the computer programs are loaded and executed on the device and the terminal, procedures or functions according to the embodiments of the present disclosure are fully or partially generated. The computer instructions may be stored in a computer-readable storage medium or may be transmitted from a computer-readable storage medium to another computer-readable storage medium. For example, the computer instructions may be transmitted from a base station, a register apparatus, a server, or a data center to another base station, register apparatus, server, or data center in a wired (for example, a coaxial cable, an optical fiber, or digital subscribe line (DSL)) manner or a wireless (for example, infrared, radio, or microwave) manner. The computer-readable storage medium may be any usable medium that can be accessed by a register apparatus, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD), or the like. In the embodiment of the embodiment, the register apparatus can include the device described above.

Although the present disclosure is described with reference to the embodiments, in a procedure of implementing the present disclosure that claims protection, one of ordinary skill in the art may understand and implement other variations of the disclosed embodiments by viewing the accompanying drawings, disclosed content, and the appended claims. In the claims, "include (including)" does not exclude other components or steps, and "a" or "one" does not exclude a case of plurality. A single processor or another unit may implement several functions enumerated in the claims. Some measures are recorded in dependent claims that are different from each other, but this does not mean that these measures cannot be combined to produce a great effect.

Although the present disclosure is described with reference to specific features and the embodiments thereof, it is clear that various modifications and combinations may be made without departing from the spirit and scope of the present disclosure. Correspondingly, the specification and the accompanying drawings are merely example illustration of the present disclosure defined by the appended claims, and is considered as any of or all modifications, variations, combinations or equivalents that cover the scope of the present disclosure. It is clear that those skilled in the art can make various modifications and variations to the present disclosure without departing from the spirit and scope of the present disclosure. Thus, the present disclosure is intended to cover these modifications and variations of the present disclosure provided that they fall within the scope defined by the following claims of the present disclosure and their equivalent technologies.

What is claimed is:

1. A method for implementing fingerprint sharing, comprising:
   Step S0, reporting, by a device, to a terminal that the device has a windows biometric framework (WBF) port and a fast authentication identity online (FIDO) port upon building, by the device, a connection with the terminal;
   Step S1, prompting, by the terminal, the user to input a fingerprint and sending a fingerprint verifying instruction to the device via the WBF port upon receiving, by the terminal, WBF register information triggered by a user;
   Step S2, receiving, by the device, the fingerprint verifying instruction, starting to collect fingerprint information and determining whether collected fingerprint information matches a stored fingerprint template; when the collected fingerprint information does not match the stored fingerprint template, returning information that verification is failed to the terminal via the WBF port;
   Step S3, when the collected fingerprint information matches the stored fingerprint template, performing, by the device, computation on the matched fingerprint template to obtain a fingerprint identification, and returning a computed fingerprint identification to the terminal via the WBF port;
   Step S4, when the terminal receives the fingerprint identification, inquiring, by the terminal, a database to determine whether user information corresponding to the fingerprint identification is stored in the database;
   Step S5, when the user information corresponding to the fingerprint identification is stored in the database, prompting, by the terminal, the user to replace a fingerprint and sending a fingerprint registering instruction to the device via the WBF port;
   Step S6, when the information that verification is failed has been returned to the terminal via the WBF port, or when the user information corresponding to the fingerprint identification is not stored in the database, prompting, by the terminal, the user to input a fingerprint and sending the fingerprint registering instruction to the device via the WBF port;
   Step S7, receiving, by the device, the fingerprint registering instruction, starting to collect fingerprint information and storing collected fingerprint information, determining whether collection of the fingerprint information is completed;
      when the collection of the fingerprint information is completed, generating a fingerprint template according to stored fingerprint information and storing the fingerprint template, performing computation on a generated fingerprint template to obtain a fingerprint identification, returning the fingerprint identification to the terminal via the WBF port and setting an identification indicating that the fingerprint is registered in FIDO configuration;
      when the collection of the fingerprint information is not completed, returning information that the collection is uncompleted to the terminal via the WBF port;
   Step S8, performing, by the terminal, a determination on received information,
      when the received information is the fingerprint identification, storing, by the terminal, the user information provided by an operating system and the fingerprint identification in the database;
      when the received information is that the collection is uncompleted, iterating through Steps S6, S7 and S8.

2. The method according to claim 1, wherein Step S7 specifically comprises:
   Step S71, receiving, by the device, a fingerprint registering instruction, starting to collect the fingerprint information and storing the fingerprint information after successful collection;
   Step S72, updating, by the device, remained collecting times and determining whether current remained collecting times is a collecting threshold value; when the current remained collecting times is not the collecting threshold value, returning information that the collection is uncompleted to the terminal via the WBF port, executing Step S8;
   Step S73, when the current remained collecting times is the collecting threshold value, generating, by the device, a fingerprint template according to the stored fingerprint information and storing the fingerprint template, performing computation on the generated fingerprint template to obtain a fingerprint identification, returning the fingerprint identification to the terminal via the WBF port, setting an identification indicating the fingerprint is registered in the FIDO configuration, executing Step S8.

3. The method according to claim 2, wherein Step S71 specifically comprises:
   Step S71-1, receiving, by the device, the fingerprint registering instruction and starting to collect the fingerprint information;
   Step S71-2, determining, by the device, whether a current collecting state is successful collection, if yes, storing the collected fingerprint information, executing Step S72, if no, returning information that the collection is failed to the terminal via the WBF port, executing Step S8;
   Step S73 further comprises: returning the current remained collecting times to the terminal via the WBF port;
   Step S8 specifically comprises:
   Step B1, determining, by the terminal, whether receiving the fingerprint identification and remained collecting times; when the fingerprint identification and remained collecting times are not received, going back to Step S6;

Step B2, when the fingerprint identification and remained collecting times are received, determining whether the remained collecting times reaches a collecting threshold value, if yes, storing, by the terminal, the user information provided by an operating system and the fingerprint identification in the database, if no, going back to Step S6.

4. The method according to claim 1, wherein before sending the fingerprint registering instruction to the device via the WBF port in Step S5, the method further comprises: when receiving information of confirming replacing, sending the fingerprint registering instruction to the device via the WBF port.

5. The method according to claim 1, wherein the performing computation on the matched fingerprint template to obtain the fingerprint identification is specifically: performing, by the device, a hash computation on the matched fingerprint template to obtain a fingerprint identification;

the performing computation on the generated fingerprint template to obtain the fingerprint identification is specifically: performing, by the device, the hash computation on the generated fingerprint template to obtain the fingerprint identification.

6. The method according to claim 1, wherein Step S4 specifically comprises:

Step S41, when the terminal receives the fingerprint identification returned from the device, searching, by the terminal, for a database via a fourth interface and opens the database via a fifth interface;

Step S42, taking, by the terminal, a first record in a found database as a current record via a sixth interface, wherein a record in the database comprises a fingerprint identification and corresponding user information that stored into the database when a fingerprint is registered;

Step S43, obtaining, by the terminal, a fingerprint identification of the current record via a seventh interface, determining whether the fingerprint identification of the obtained current record matches the received fingerprint identification; when the fingerprint identification of the current record matches the received fingerprint identification, the user information corresponding to the received fingerprint identification is stored in the database, executing Step S5;

Step S44, when the fingerprint identification of the current record does not match the received fingerprint identification, determining, by the terminal, whether an unprocessed record exists in the database; when the unprocessed record does not exist in the database, executing Step S6;

Step S45, when the unprocessed record exists in the database, taking, by the terminal, a next record in the found database as the current record via an eighth interface, going back to Step S43.

7. The method according to claim 1, wherein after Step S0, the method further comprises:

Step T1, when the terminal receives login information, determining, by the terminal, a login manner selected by the user;

Step T2, when the login manner is a type of WBF fingerprint login, prompting, by the terminal, the user to input the fingerprint and sending a fingerprint verifying instruction to a connected device via the WBF port;

Step T3, receiving, by the device, the fingerprint verifying instruction, starting to collect fingerprint information, determining whether collected fingerprint information matches the stored fingerprint template; when the collected fingerprint information does not match the stored fingerprint template, reporting an error, and ending;

Step T4, when the collected fingerprint information matches the stored fingerprint template, performing, by the device, computation on the matched fingerprint template to obtain a fingerprint identification and returns the fingerprint identification to the terminal via the WBF port;

Step T5, when receiving the fingerprint identification returned from the device, searching, by the terminal, for corresponding user information in the database according to the fingerprint identification; when the corresponding user information is not found, ending;

Step T6, when the corresponding user information is found, permitting, by the terminal, the user corresponding to the user information to perform a current operation.

8. The method according to claim 1, wherein after Step S0, the method further comprises:

Step Y1, sending, by the terminal, a device information obtaining instruction to a connected device via the FIDO port upon receiving, by the terminal, FIDO register credential information triggered by the user;

Step Y2, returning, by the device, a device information response to the terminal via the FIDO port;

Step Y3, determining, by the terminal, whether the connected device supports a fingerprint operation according to received device information response; when the connected device does not support the fingerprint operation, executing a non-fingerprint FIDO register credential process;

Step Y4, when the connected device supports the fingerprint operation, determining, by the terminal, whether a fingerprint template is stored in the device according to the device information response; when the fingerprint template is not stored in the device, executing the non-fingerprint FIDO register credential process;

Step Y5, when the fingerprint template is stored in the device, sending, by the terminal, an FIDO registering instruction to the connected device via the FIDO port;

Step Y6, receiving, by the device, the FIDO registering instruction, starting to collect fingerprint information, determining whether collected fingerprint information matches the stored fingerprint template;

when the collected fingerprint information matches the stored fingerprint template, returning information that registering is successful to the terminal via the FIDO port;

when the collected fingerprint information does not match the stored fingerprint template, returning information that registering is failed to the terminal via the FIDO port Step Y7, determining, by the terminal, a type of received information, if the received information is that registering is successful, keeping on performing an FIDO register credential operation, if the received information is that registering is failed, reporting an error and ending.

9. The method according to claim 8, wherein the device information response comprises an identification indicating that fingerprint is registered in the FIDO configuration;

the Step Y4 specifically comprises: determining, by the terminal, whether the received device information response comprises an identification indicating that fingerprint is registered, if yes, the device stores the fingerprint template, and executing Step Y5; if no, the device does not store the fingerprint template, and executing a non-fingerprint FIDO register credential process.

10. A method for implementing fingerprint sharing, comprising:

Step s0, reporting, by a device, to a terminal that the device has a windows biometric framework (WBF) port and a fast authentication identity online (FIDO) port upon building, by the device, a connection with the terminal;

Step s1, prompting, by the terminal, a user to input a fingerprint and sending a fingerprint verifying instruction to the device via the WBF port upon receiving, by the terminal, WBF register information triggered by the user;

Step s2, receiving, by the device, a fingerprint verifying instruction, starting to collect fingerprint information and determining whether collected fingerprint information and stored fingerprint template are matched; when the collected fingerprint information and stored fingerprint template are not matched, returning information that verification is failed to the terminal via the WBF port; wherein the stored fingerprint template is stored in a process of registering a fingerprint via the WBF port or via the FIDO port;

Step s3, when the collected fingerprint information and stored fingerprint template are matched, performing, by the device, computation on a matched fingerprint template to obtain a fingerprint identification and returning the fingerprint identification to the terminal via the WBF port;

Step s4, when the terminal receives the fingerprint identification returned by the device, inquiring, by the terminal, a database to determine whether user information corresponding to a received fingerprint identification is stored in the database, if yes, prompting, by the terminal, that a current fingerprint is registered already, if no, storing the user information provided by an operating system and the received fingerprint identification correspondingly in the database;

Step s5, when the information that verification is failed has been returned to the terminal via the WBF port, prompting, by the terminal, the user to input a fingerprint and sending a fingerprint registering instruction to the device via the WBF port;

Step s6, receiving, by the device, the fingerprint registering instruction, starting to collect fingerprint information and storing collected fingerprint information, determining whether collection of fingerprint information is completed;

when the collection of fingerprint information is completed, generating a fingerprint template according to stored fingerprint information and storing a generated fingerprint template, performing computation on the generated fingerprint template to obtain a fingerprint identification, returning the fingerprint identification to the terminal via the WBF port;

when the collection of fingerprint information is not completed, returning information that collection is uncompleted to the terminal via the WBF port;

Step s7, performing, by the terminal, a determination on received information, if the received information is a fingerprint identification, storing the user information provided by the operating system and the fingerprint identification correspondingly in the database, if the received information is that collection is uncompleted, iterating through Steps s5, s6 and s7.

11. The method according to claim 10, wherein before Step s1, the method further comprises: determining, by the terminal, whether a type of the application is a WBF application upon detecting that the user triggers the application.

12. The method according to claim 11, wherein, after Step s0, the method further comprises:

Step a1, when the type of the application is the WBF application and a type of the trigger information of which the user triggers the application is WBF login information, prompting, by the terminal, the user to input a fingerprint and sending a fingerprint verifying instruction to the device via the WBF port;

Step a2, receiving, by the device, the fingerprint verifying instruction, starting to collect fingerprint information, determining whether collected fingerprint information matches a stored fingerprint template; when the collected fingerprint information does not match the stored fingerprint template, reporting an error and ending;

Step a3, when the collected fingerprint information matches the stored fingerprint template, performing, by the device, computation on the matched fingerprint template to obtain a fingerprint identification, returning the fingerprint identification to the terminal via the WBF port;

Step a4, when the terminal receives the fingerprint identification returned from the device, inquiring, by the terminal, the database to determine whether user information corresponding to the fingerprint identification is stored in the database; when the user information corresponding to the fingerprint identification is not stored in the database, reporting an error and ending;

Step a5, when the user information corresponding to the fingerprint identification is stored in the database, obtaining, by the terminal, the user information corresponding to the received fingerprint identification and permitting a user corresponding to the user information to perform a login operation.

13. The method according to claim 10, wherein the performing the computation on the matched fingerprint template to obtain the fingerprint identification is specifically: performing a hash computation on the matched fingerprint template to obtain the fingerprint identification;

the performing the computation on the generated fingerprint template to obtain the fingerprint identification is specifically: performing the hash computation on the generated fingerprint template to obtain the fingerprint identification.

14. The method according to claim 10, wherein Step s4 specifically comprises:

Step s4-1, when the terminal receives a fingerprint identification returned by the device, searching, by the terminal, for a database via a fourth interface and opens the database via a fifth interface;

Step s4-2, taking, by the terminal, a first record in the found database as a current record via a sixth interface, wherein a record in the database comprises a fingerprint identification and corresponding user information that stored into the database when a fingerprint is registered;

Step s4-3, obtaining, by the terminal, a fingerprint identification of the current record via a seventh interface, determining whether the fingerprint identification of an obtained current record matches the received fingerprint identification; when the fingerprint identification of the current record matches the received fingerprint identification, the user information corresponding to the received fingerprint identification is stored in the database, and prompting that the current fingerprint is registered;

Step s4-4, when the fingerprint identification of the current record does not match the received fingerprint identification, determining, by the terminal, whether an unprocessed record exists in the database; when the unprocessed record does not exist in the database, storing the user information provided by the operating system and the received fingerprint identification correspondingly in the database;

Step s4-5, when the unprocessed record exists in the database, taking, by the terminal, a next record in the found database as a current record via an eighth interface, going back to Step s4-3.

15. The method according to claim 10, wherein Step s6 specifically comprises:

Step d1, receiving, by the device, the fingerprint registering instruction and starting to collect fingerprint information and storing the fingerprint information after successful collection;

Step d2, updating, by the device, remained collecting times, determining whether current remained collecting times is a collecting threshold value; when the current remained collecting times is not the collecting threshold value, returning information that collection is uncompleted to the terminal via the WBF port, executing Step s7;

Step d3, when the current remained collecting times is the collecting threshold value, generating, by the device, a fingerprint template according to the stored fingerprint information and storing the fingerprint template, performing computation on the generated fingerprint template to obtain a fingerprint identification, returning the fingerprint identification to the terminal via the WBF port, executing Step s7.

16. The method according to claim 15, wherein the Step d1 specifically comprises:

Step d1-1, receiving, by the device, a fingerprint registering instruction and starting to collect the fingerprint information;

Step d1-2, determining, by the device, whether a collecting state is successful collection, if yes, storing the collected fingerprint information, executing Step d2, if no, returning information that collection is failed to the terminal via the WBF port, executing Step s7;

Step d3 further comprises: returning current remained collecting times to the terminal via the WBF port;

Step s7 specifically comprises:

Step P1, determining, by the terminal, whether receiving the fingerprint identification and the remained collecting times; when the fingerprint identification and the remained collecting times are not received, prompting the user to input the fingerprint and sending the fingerprint registering instruction to the device via the WBF port;

Step P2, when the fingerprint identification and the remained collecting times have been received, determining, by the terminal, whether the remained collecting times is a collecting threshold value, if yes, storing the user information provided by the operating system and the fingerprint identification correspondingly in the database, if no, prompting the user to input the fingerprint and sending the fingerprint registering instruction to the device via the WBF port.

17. The method according to claim 10, wherein after Step s0, the method further comprises:

Step b1, determining, by the terminal, a type of an application and a type of triggering information of which a user triggers an application upon detecting that the user triggers the application;

Step b2, when the type of the application is an FIDO application and the type of triggering information of which the user triggers the application is FIDO register information, obtaining, by the terminal, a device information response from the connected device via the FIDO port;

Step b3, determining, by the terminal, whether the connected device supports an FIDO operation according to received device information response; when the connected device does not support the FIDO operation, reporting an error and ending;

Step b4, when the connected device supports the FIDO operation, obtaining, by the terminal, a device attribution response from the connected device via the FIDO port;

Step b5, determining, by the terminal, whether the connected device supports a fingerprint operation according to received device attribution response; when the connected device does not support the fingerprint operation, performing a non-fingerprint FIDO register process;

Step b6, when the connected device supports the fingerprint operation, prompting, by the terminal, the user to input a PIN code, when the terminal receives the PIN code input by the user, generating a PIN code verifying instruction according to the PIN code and sending the PIN code verifying instruction to the connected device via the FIDO port;

Step b7, verifying, by the device, the PIN code in the PIN code verifying instruction; if verification is successful, returning information that verification is successful to the terminal via the FIDO port;

if verification is failed, returning information that verification is failed to the terminal via the FIDO port;

Step b8, when the information that verification is successful is returned to the terminal via the FIDO port, sending, by the terminal, a fingerprint registering instruction to the connected device via the FIDO port;

Step b9, starting, by the device, to collect fingerprint information after receiving the fingerprint registering instruction and storing collected fingerprint information, determining whether collection of fingerprint information is completed;

when the collection of fingerprint information is completed, generating a fingerprint template according to the stored fingerprint information and storing the fingerprint template, returns information that collection is completed to the terminal via the FIDO port;

when the collection of fingerprint information is not completed, returning information that collection is uncompleted to the terminal via the FIDO port;

Step b10, determining, by the terminal, whether a register process is completed according to information returned from the device, if yes, prompting that fingerprint register is successful, if no, going back to Step b8.

18. The method according to claim 17, wherein between Step b5 and Step b6, the method further comprises: obtaining, by the terminal, a fingerprint attribution response comprising the collecting threshold value from the connected device via the FIDO port;

Step b9 specifically comprises:
Step t0, after receiving the fingerprint registering instruction, starting, by the device, to collect fingerprint information;
Step t1, determining, by the device, whether a collecting state is that collection is successful; when the collection state is that collection is not successful, returning information that collection is failed to the terminal via the FIDO port, executing Step b10;
Step t2, when the collection state is that collection is successful, storing, by the device, the collected fingerprint information, updating remained collecting times and determining whether current remained collecting times is a collecting threshold value, if yes, generating a fingerprint template according to the stored fingerprint information and storing the fingerprint template, returning information that collection is completed and current remained collecting times to the terminal via the FIDO port, executing Step b10, if no, returning information that collection is uncompleted to the terminal via the FIDO port, executing Step b10;
Step b10 specifically comprises:
Step b10-1, determining, by the terminal, whether information returned by the device comprises information that collection is completed and the remained collecting times, if yes, executing Step b10-2, if no, going back to Step b8;
Step b10-2, determining, by the terminal, whether the remained collecting times is a collecting threshold value, if yes, prompting that fingerprint register is successful, if no, going back to Step b8.

19. A system for implementing fingerprint sharing, comprising a terminal and a device, wherein each of the device and the terminal comprises at least one processor, a memory and instructions stored in the memory that can be executed by the at least one processor, the at least one processor executes the instructions to implement the following operations:
Step S0, reporting, by a device, to a terminal that the device has a windows biometric framework (WBF) port and a fast authentication identity online (FIDO) port upon building, by the device, a connection with the terminal;
Step S1, prompting, by the terminal, the user to input a fingerprint and sending a fingerprint verifying instruction to the device via the WBF port upon receiving, by the terminal, WBF register information triggered by a user;
Step S2, receiving, by the device, the fingerprint verifying instruction, starting to collect fingerprint information and determining whether collected fingerprint information matches a stored fingerprint template; when the collected fingerprint information does not match the stored fingerprint template, returning information that verification is failed to the terminal via the WBF port;
Step S3, when the collected fingerprint information matches the stored fingerprint template, performing, by the device, computation on the matched fingerprint template to obtain a fingerprint identification, and returning a computed fingerprint identification to the terminal via the WBF port;
Step S4, when the terminal receives the fingerprint identification, inquiring, by the terminal, a database to determine whether user information corresponding to the fingerprint identification is stored in the database;
Step S5, when the user information corresponding to the fingerprint identification is stored in the database, prompting, by the terminal, the user to replace a fingerprint and sending a fingerprint registering instruction to the device via the WBF port;
Step S6, if the information that verification is failed has been returned to the terminal via the WBF port, or when the user information corresponding to the fingerprint identification is not stored in the database, prompting, by the terminal, the user to input a fingerprint and sending the fingerprint registering instruction to the device via the WBF port;
Step S7, receiving, by the device, the fingerprint registering instruction, starting to collect fingerprint information and storing collected fingerprint information, determining whether collection of the fingerprint information is completed;
when the collection of the fingerprint information is completed, generating a fingerprint template according to stored fingerprint information and storing the fingerprint template, performing computation on a generated fingerprint template to obtain a fingerprint identification, returning the fingerprint identification to the terminal via the WBF port and setting an identification indicating that the fingerprint is registered in FIDO configuration;—
when the collection of the fingerprint information is not completed, returning information that the collection is uncompleted to the terminal via the WBF port;
Step S8, performing, by the terminal, a determination on received information,
when the received information is the fingerprint identification, storing, by the terminal, the user information provided by an operating system and the fingerprint identification in the database;
when the received information is that the collection is uncompleted, iterating through Steps S6, S7 and S8.

* * * * *